(12) United States Patent
Arditi

(10) Patent No.: US 9,738,358 B2
(45) Date of Patent: Aug. 22, 2017

(54) ENHANCED SYSTEM AND METHOD FOR DEPLOYING BOAT FENDERS SAFELY AND CONVENIENTLY

(71) Applicant: Shmuel Sam Arditi, Discovery Bay, CA (US)

(72) Inventor: Shmuel Sam Arditi, Discovery Bay, CA (US)

(*) Notice: Subject to any disclaimer, the term of this patent is extended or adjusted under 35 U.S.C. 154(b) by 0 days.

(21) Appl. No.: 15/178,515

(22) Filed: Jun. 9, 2016

(65) Prior Publication Data

US 2016/0304175 A1  Oct. 20, 2016

Related U.S. Application Data

(63) Continuation-in-part of application No. 15/054,125, filed on Feb. 25, 2016, now Pat. No. 9,409,637, which is a continuation-in-part of application No. 14/929,369, filed on Nov. 1, 2015, now Pat. No. 9,440,716, application No. 15/178,515, which is a continuation-in-part of application No. 14/981,858, filed on Dec. 28, 2015, now Pat. No. 9,598,157, which is a continuation-in-part of application No. 14/929,369.

(60) Provisional application No. 62/148,725, filed on Apr. 16, 2015, provisional application No. 62/153,185, filed on Apr. 27, 2015, provisional application No. 62/157,857, filed on May 6, 2015, provisional application No. 62/165,798, filed on May 22, 2015, provisional application No. 62/000,089, filed on Aug. 2, 2015, provisional application No. 62/153,193, filed on Apr. 27, 2015.

(51) Int. Cl.
B63B 59/02 (2006.01)
B63J 3/00 (2006.01)
B63J 99/00 (2009.01)

(52) U.S. Cl.
CPC ............ *B63B 59/02* (2013.01); *B63J 3/00* (2013.01); *B63J 99/00* (2013.01); *B63B 2710/00* (2013.01); *B63J 2003/003* (2013.01); *B63J 2099/006* (2013.01)

(58) Field of Classification Search
CPC ......... B63B 59/02; B63B 27/00; B63B 17/00; B63B 59/00
USPC ........ 114/219, 343, 364; 405/212, 213, 214, 405/215
See application file for complete search history.

(56) References Cited

U.S. PATENT DOCUMENTS

| 2,179,125 A * | 11/1939 | Kirlin ................ E02B 3/26 114/219 |
| 6,758,155 B1 | 7/2004 | Nicholas |
| 7,007,622 B1 | 3/2006 | Clark |
| 8,726,824 B2 | 5/2014 | Jarke |

(Continued)

*Primary Examiner* — Lars A Olson
(74) *Attorney, Agent, or Firm* — Galvin Patent Law LLC; Brian R. Galvin

(57) ABSTRACT

An enhanced system and various methods for safe and convenient deployment and retraction of boat fenders, comprising a system for stowing a boat fender in a fender receptacle, the receptacle having an opening for threading through a line, the line being attached to the fender, the line operable to pull up the fender into the receptacle through a second opening at the bottom of the receptacle, the receptacle being located within the rail, hull, or attached thereto, and being attached to a hinge, operated either mechanically or manually, to enable unobstructed deployment of the fenders.

19 Claims, 23 Drawing Sheets

(56) References Cited

U.S. PATENT DOCUMENTS

| | | |
|---|---|---|
| 9,038,556 B2 | 5/2015 | Ulgen |
| 9,409,637 B1 * | 8/2016 | Arditi .................... B63B 59/02 |
| 2005/0242332 A1 | 11/2005 | Ueki |
| 2008/0023681 A1 | 1/2008 | Cunningham |
| 2009/0266283 A1 | 10/2009 | Wrage et al. |
| 2014/0257631 A1 | 9/2014 | Heravi et al. |

* cited by examiner

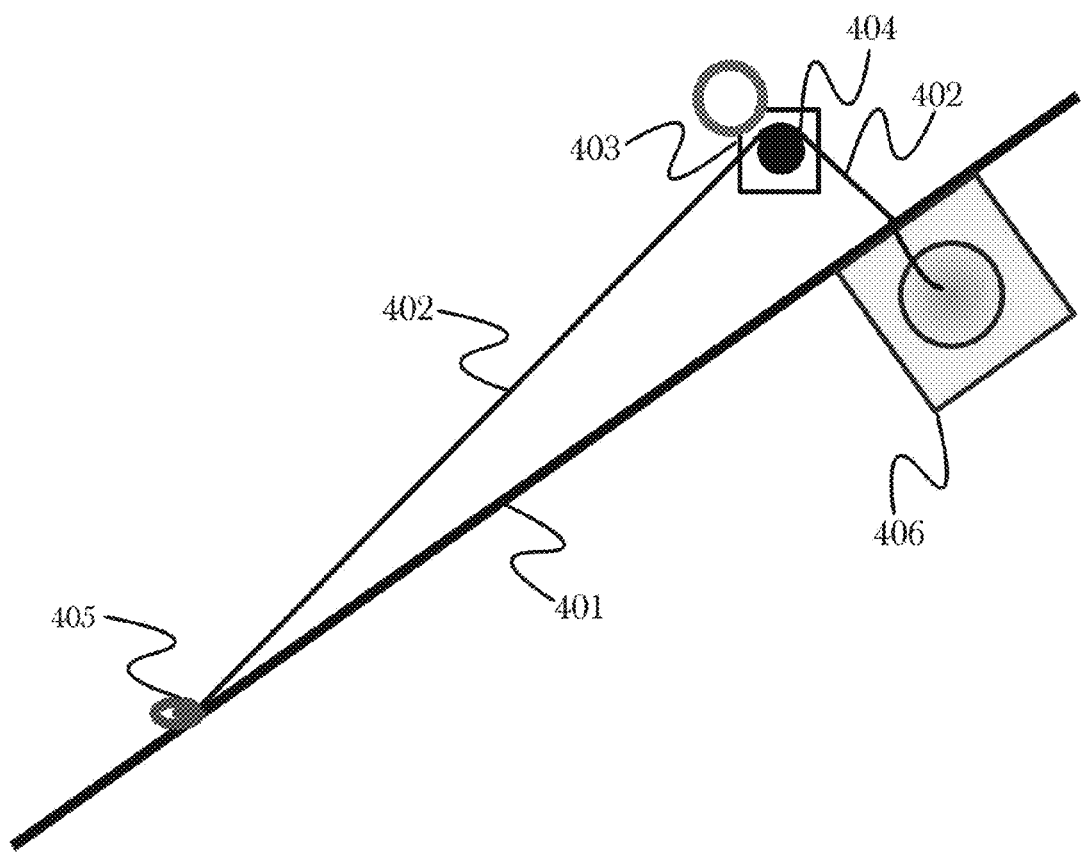
Figure 4

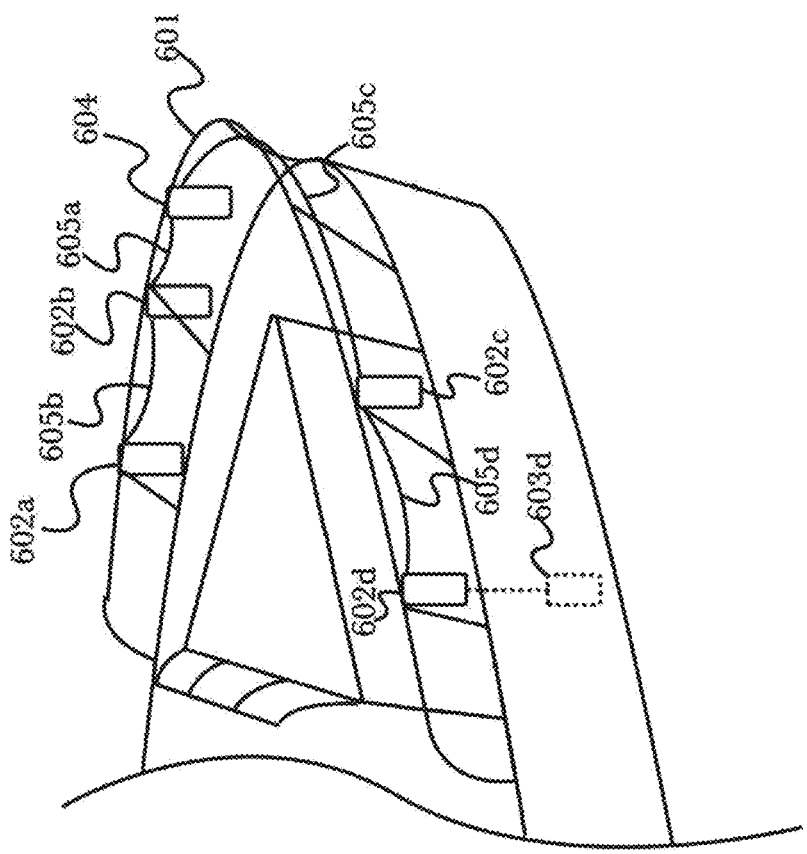
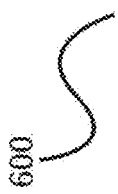
Fig. 6

ENHANCED SYSTEM AND METHOD FOR DEPLOYING BOAT FENDERS SAFELY AND CONVENIENTLY

CROSS-REFERENCE TO RELATED APPLICATIONS

This application is a continuation-in-part of U.S. patent application Ser. No. 15/054,125 titled "ENHANCED SYSTEM AND METHOD FOR REMOTELY DEPLOYING BOAT FENDERS", filed on Feb. 25, 2016, which claims the benefit of and priority to U.S. provisional patent application Ser. No. 62/148,725, titled "SYSTEM AND METHOD FOR SAFELY AND CONVENIENTLY DEPLOYING BOAT FENDERS", filed on Apr. 16, 2015, and to U.S. provisional patent application Ser. No. 62/153,185, titled "ENHANCED SYSTEM AND METHOD FOR AUTOMATICALLY DEPLOYING BOAT FENDERS 2", filed on Apr. 27, 2015, and to U.S. provisional patent application Ser. No. 62/157,857, titled "SYSTEM AND METHOD FOR REDUCING THE PROFILE OF BOAT FENDER BASKETS", filed on May 6, 2015, and to 62/165,798, titled "AUTOMATIC BOAT FENDER BASKETS", filed on May 22, 2015, and to 62/200,089, titled "AUTOMATIC BOAT FENDER LINE GUIDE, CAMERA AND MORE", filed on Aug. 2, 2015, and which is also a continuation-in-part of U.S. patent application Ser. No. 14/929,369, titled "ENHANCED SYSTEM AND METHOD FOR AUTOMATICALLY DEPLOYING BOAT FENDERS", filed on Nov. 1, 2015, which claims the benefit of and priority to U.S. provisional patent application Ser. No. 62/153,193, titled "ENHANCED SYSTEM AND METHOD FOR AUTOMATICALLY DEPLOYING BOAT FENDERS", filed on Apr. 27, 2015. The disclosure of each of the above-referenced patent applications is incorporated herein by reference in its entirety.

This application is also a continuation-in-part of U.S. patent application Ser. No. 14/981,858 titled "ENHANCED SYSTEM AND METHOD FOR DETANGLING AND PROTECTION OF AUTOMATIC FENDER POSITIONING SYSTEMS", filed on Dec. 28, 2015, which and claims the benefit of and priority to U.S. provisional patent application Ser. No. 62/148,725, titled "SYSTEM AND METHOD FOR SAFELY AND CONVENIENTLY DEPLOYING BOAT FENDERS", filed on Apr. 16, 2015, and to U.S. provisional patent application Ser. No. 62/153,185, titled "ENHANCED SYSTEM AND METHOD FOR AUTOMATICALLY DEPLOYING BOAT FENDERS 2", filed on Apr. 27, 2015, and to U.S. provisional patent application Ser. No. 62/157,857, titled "SYSTEM AND METHOD FOR REDUCING THE PROFILE OF BOAT FENDER BASKETS", filed on May 6, 2015, and to 62/165,798, titled "AUTOMATIC BOAT FENDER BASKETS", filed on May 22, 2015, and to 62/200,089, titled "AUTOMATIC BOAT FENDER LINE GUIDE, CAMERA AND MORE", filed on Aug. 2, 2015, and which is also a continuation-in-part of U.S. patent application Ser. No. 14/929,369 titled "ENHANCED SYSTEM AND METHOD FOR AUTOMATICALLY DEPLOYING BOAT FENDERS", filed on Nov. 1, 2015, which claims the benefit of and priority to U.S. provisional patent application Ser. No. 62/153,193, titled "ENHANCED SYSTEM AND METHOD FOR AUTOMATICALLY DEPLOYING BOAT FENDERS", filed on Apr. 27, 2015. The disclosure of each of the above-referenced patent applications is incorporated herein by reference in its entirety.

BACKGROUND OF THE INVENTION

Field of the Invention

The disclosure relates to the field of boating, and more particularly to the field of deploying protective fenders for use in docking a boat.

Discussion of the State of the Art

Boating, in a motorized or sail-powered craft, is both a popular recreational activity and the foundation of the seafood industry. The operator of the craft must be able to navigate it safely and also to dock it safely, whether at a stationary, land-based dock, next to another boat, or at some other, similar large adjacent object (any and all of which are hereinafter referred to as a "dock"). In cases of stormy weather or large waves, deploying and positioning the protective boat fenders to keep the boat from violently hitting a dock can be tricky and dangerous.

What is needed is a system and method that enables a boat operator to safely and conveniently deploy boat fenders when needed. What is additionally needed is a way to extend and retract boat fender into and out of protective stowage enclosures from locations remote from the placement of at least some of those fenders, for added safety and convenience. Further needed in other cases is a way to extend and retract boat fenders using a motor-driven mechanism, for even greater added safety and convenience. Additionally needed, in some cases, is a way to extend and retract boat fender baskets beyond a hull limit or in other cases, to extend and retract fenders through an opening in a boat railing.

SUMMARY OF THE INVENTION

The inventor has conceived and reduced to practice, in a preferred embodiment of the invention, an enhanced system and various methods for remotely deploying boat fenders.

According to a preferred embodiment of the invention, a system with a protective enclosure for stowing a boat fender, the protective enclosure attached to a vessel, the protective enclosure having an opening for threading through a line, the line being attached to the boat fender by a spring or elastic cord, the line operable to pull the fender into the protective enclosure through the opening in the protective enclosure;

According to another preferred embodiment of the invention, a system wherein at least one of the protective enclosures possess a moveable bar positioned across a lower opening of the protective enclosure above the fender, the moveable bar having an opening for guiding the line, which passes through it the moveable bar being moveable along a substantially vertical cylindrical axis of the protective enclosure and acts to guide the fender as it is pulled with the boat fender into the protective enclosure. The line threaded through the protective enclosure of at least one of the protective enclosures is attached directly to the boat fender. The line of at least one of the protective enclosures is routed inside the protective enclosure and exits from any point along a length of the protective enclosure including the opening through which the fender is stowed and deployed, obviating the need for a second opening. The moveable bar of at least one of the protective enclosures is replaced by a plate and the moveable bar of at least one other protective enclosure is replaced by a cage. The protective enclosure has at least one moveable hinged section, the section formed in such a manner, that when the fender is retracted into the top of the protective enclosure, the movable section clamps in on the fender and secures it within the protective enclosure. A plurality of components are made of soft plastic suitable for molding. The protective enclosure and the moveable bar is made of a rigid material. A plurality of components comprise are made of a combination of rigid metal parts and soft plastic materials. A fast cleat is provided to secure a line in a plurality of positions, one of which has the fender fully retracted and at least one other of which has the fender deployed and wherein the fast cleat is mounted in an easy to reach location on the vessel.

The fast cleat may be released with a controlled jerking of the line, either by mechanized means or manually. The protective enclosure may be mounted with at least one hinge to a stationary part of the boat within the boat's outline, the hinge operable to allow the protective enclosure to swing out from the boat's outline, for easy deployment of the fender and further comprising a lever attached to a second stationary part of the boat, the lever being used to initiate and stop or reverse the swinging out of the protective enclosure. Wherein the lever may be a hinged arm. Wherein the lever may be operated manually. The lever may be operated by a mechanized system such as a motor or hydraulic piston. An external force makes the protective enclosure swing back into the hull line. The protective enclosure may be mounted with a hinge, enabling the protective enclosure to extend out through an opening in the railing, to facilitate an easier deployment of the fender. Wherein the fender is deployed with the help of a motor. Wherein swing-out is achieved with the help of an additional motor According to another a preferred embodiment of the invention, a system with a protective enclosure for stowing a boat fender, the protective enclosure attached to a vessel, the protective enclosure having an opening for threading through a line, the line being attached to the fender, the line operable to pull up the fender into the protective enclosure through a second opening at the bottom of the protective enclosure and where a moveable bar exists across its opening directly above the fender, the bar having a small opening for guiding the line, which passes through it, the bar being moveable along the cylindrical axis of the protective enclosure. In a variation of the embodiment, the bar is pulled up along with the fender into the protective enclosure. Where the protective enclosure has at least one moveable, hinged section, the section formed in such a manner that when the fender is pulled up into the top of the protective enclosure, the movable section clamps in on the fender and secures it within the protective enclosure.

In one preferred embodiment, a cleat (or auto cleat) allows the line to be secured at any position, the cleat attached to or near the protective enclosure, or at a convenient location some distance from the protective enclosure, by passing the line through one or more guide rings or pulleys, and the fender is raised into the protective enclosure upon leaving a dock and lowered to the correct level manually in preparation for docking of the boat.

In another preferred embodiment, the fender is attached to the line, the line coupled to a winch, the winch coupled to a motor, and the motor controlled by a controller, wherein the controller is activated via wireline or wireless control signals. Here, the controller may be controlling more than one protective enclosure. The winch may draw its power from a battery, where the battery is the onboard power supply or the battery is separate and recharged by a solar panel coupled to the battery. Each protective enclosure may have its individual controller, battery and solar panel, as to not require any wiring between the units.

The protective enclosure may be mounted with at least one hinge to a stationary part of the boat within the boat's outline, the hinge operable to allow the protective enclosure to swing out from the boat's outline, for easy deployment of the fender. Deployment of the protective enclosure may be controlled for the swing-out with a lever, the lever attached to a second stationary part of the boat, the lever being used to initiate and stop or reverse the swing-out action. The lever may also be a hinged arm and may be operated manually or operated with an additional motor or hydraulic piston.

Alternately, the protective enclosure may be mounted on at least one stationary part of the boat, substantially within the boat's outline, the protective enclosure having an angle for enabling the fender to be lowered, either manually or mechanically, through an opening in the railing over the edge of the boat's board and have an additional slide extension at the bottom opening, the extension guiding the fender over the edge of the boat.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 4 shows an exemplary representation of a pulley and remote cleat mechanism for the safe and convenient stowage and deployment of boat fenders according to a preferred embodiment of the invention.

FIG. 6. shows an exemplary representation of the connection of four enclosure and fender mechanisms connected by wires to a solar panel according to a preferred embodiment of the invention.

Figure 7:
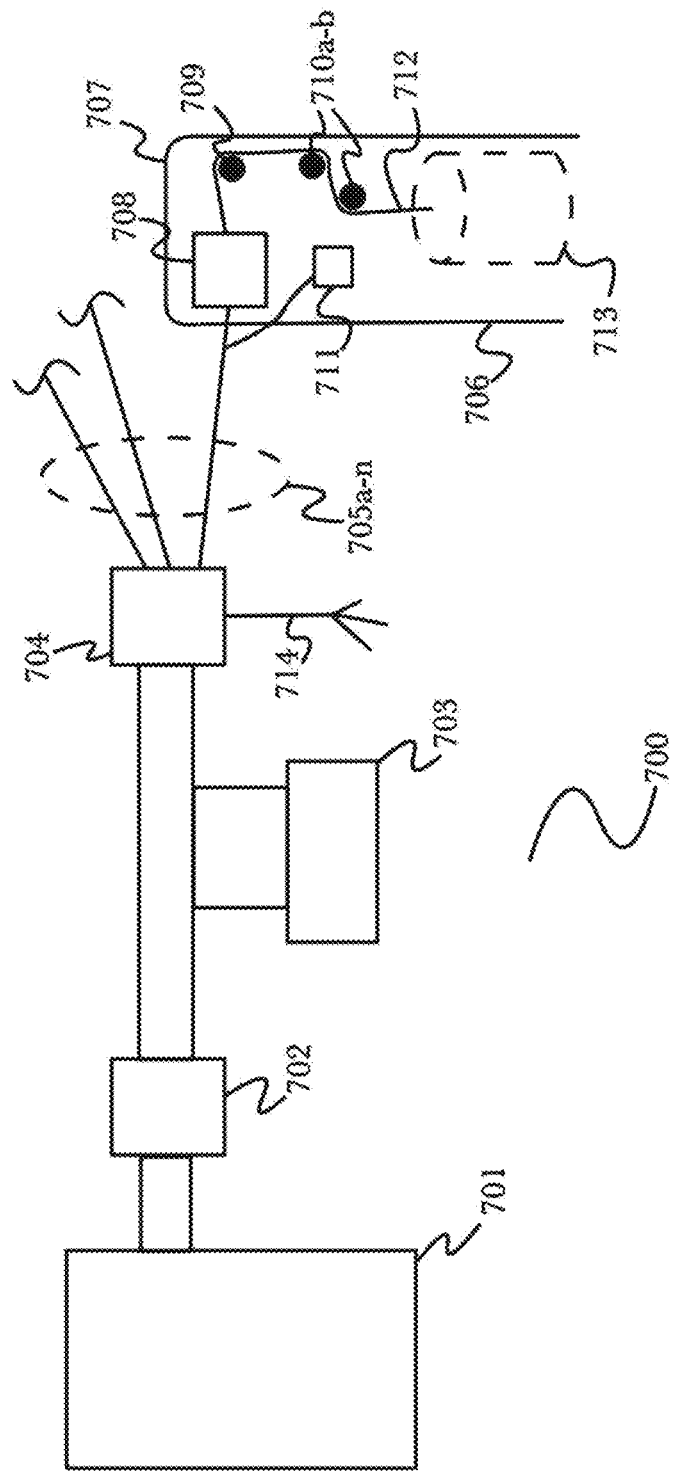

FIG. 7 is a diagram of an exemplary solar panel assembly connected to a basket and fender mechanism according to a preferred embodiment of the invention.

Figure 8:
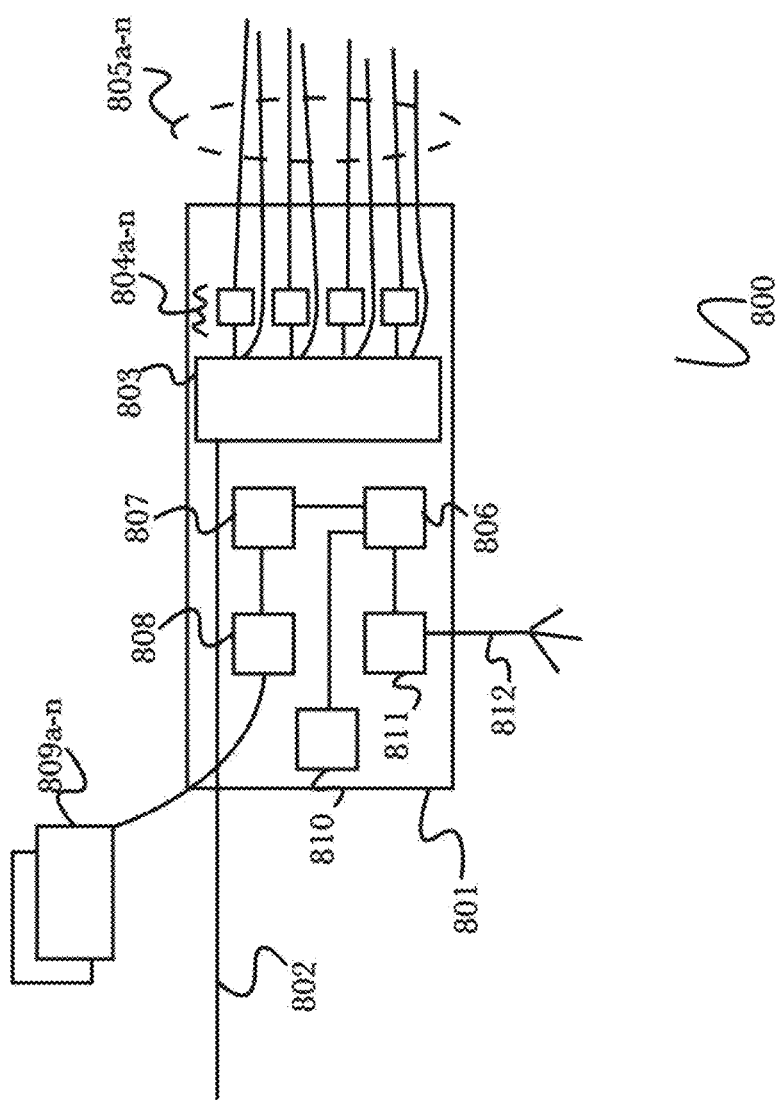

FIG. 8 is a diagram of an exemplary controller for the deployment and retraction of fenders according to a preferred embodiment of the invention.

Figure 9:
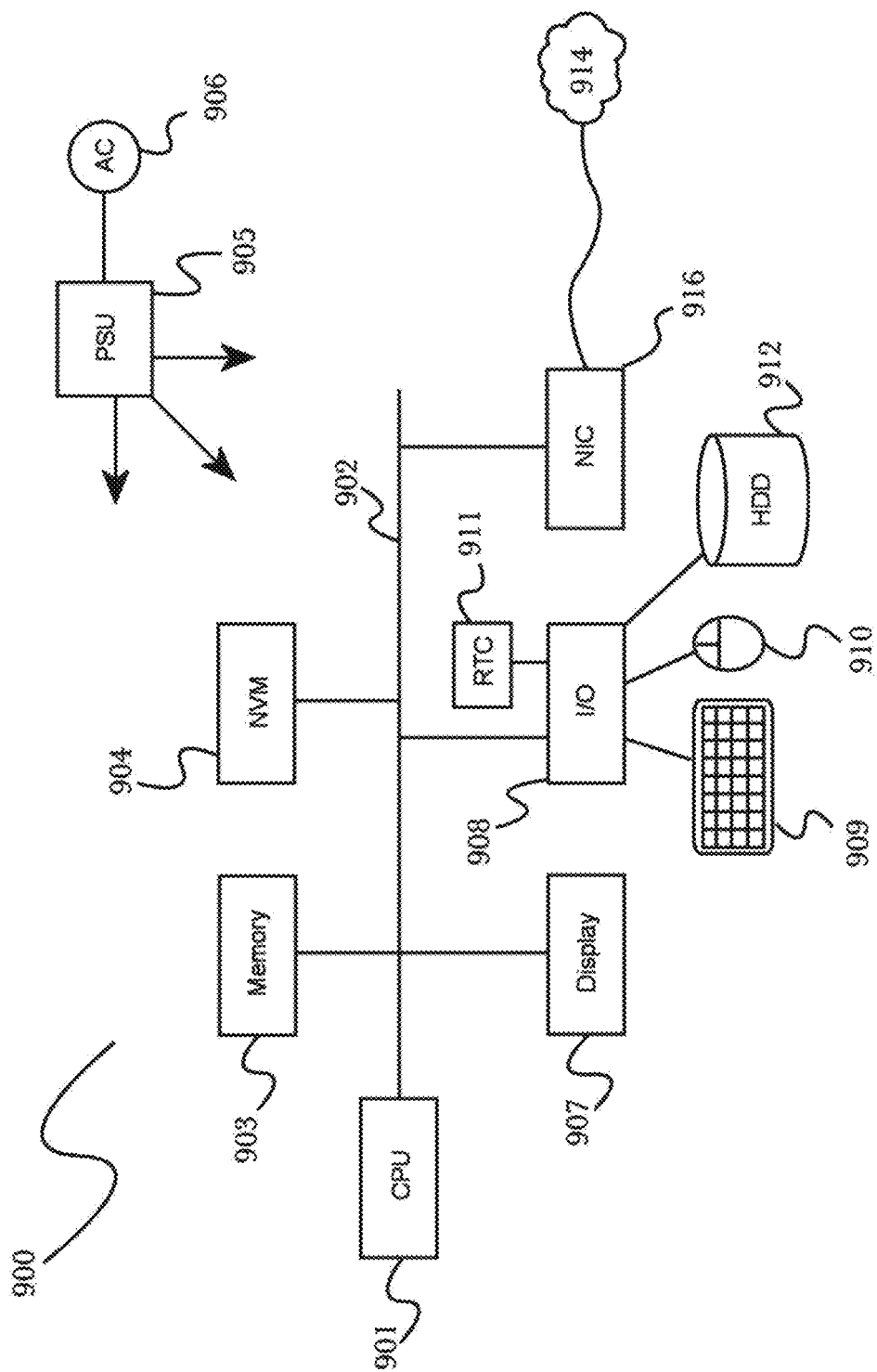

FIG. 9 is an exemplary diagram of a computer system as may be used in the system and methods disclosed herein.

Figure 10:
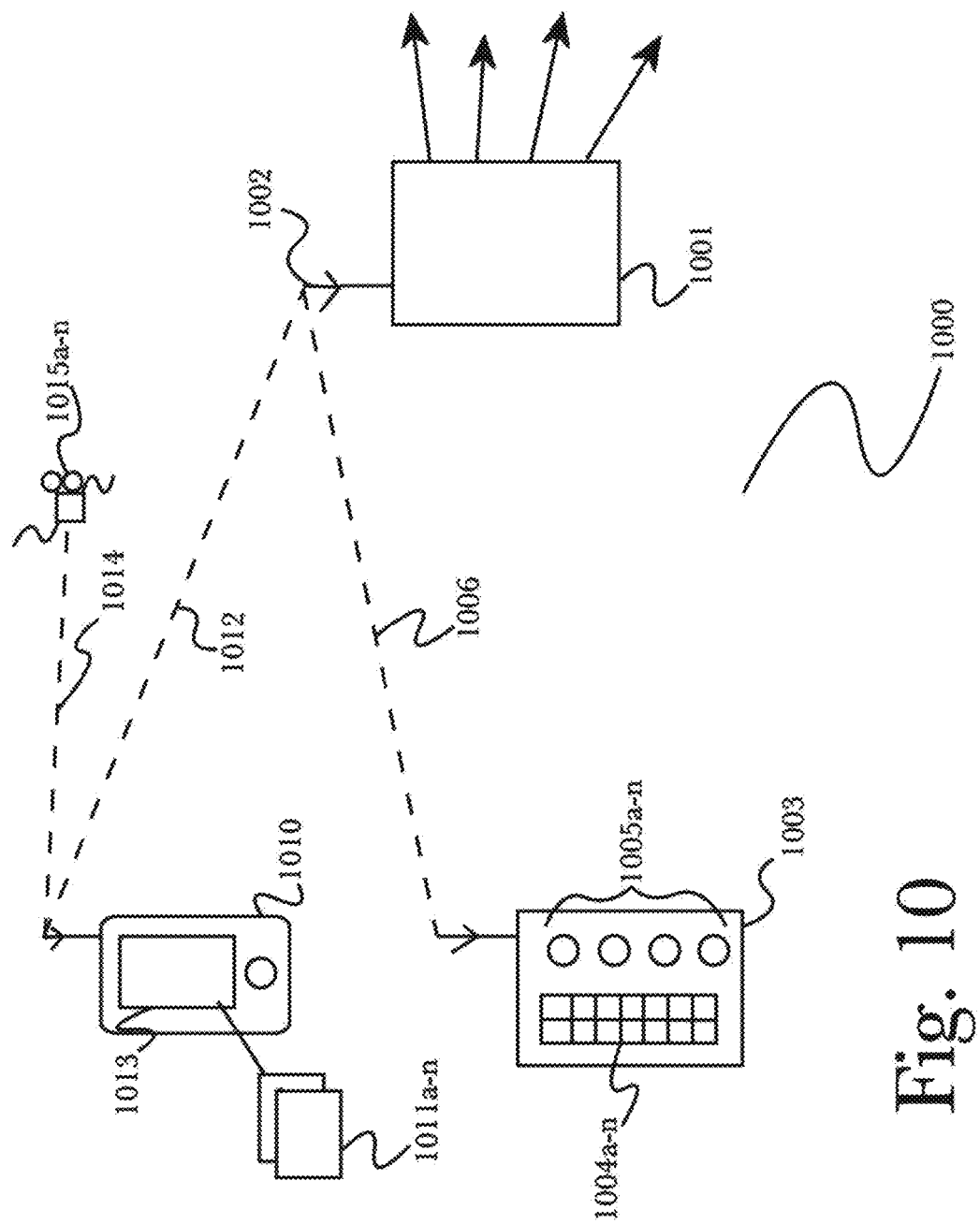

FIG. 10 is an exemplary diagram of a wireless control system for deployment an retraction of boat fenders as per a preferred embodiment of the invention.

Figure 11:
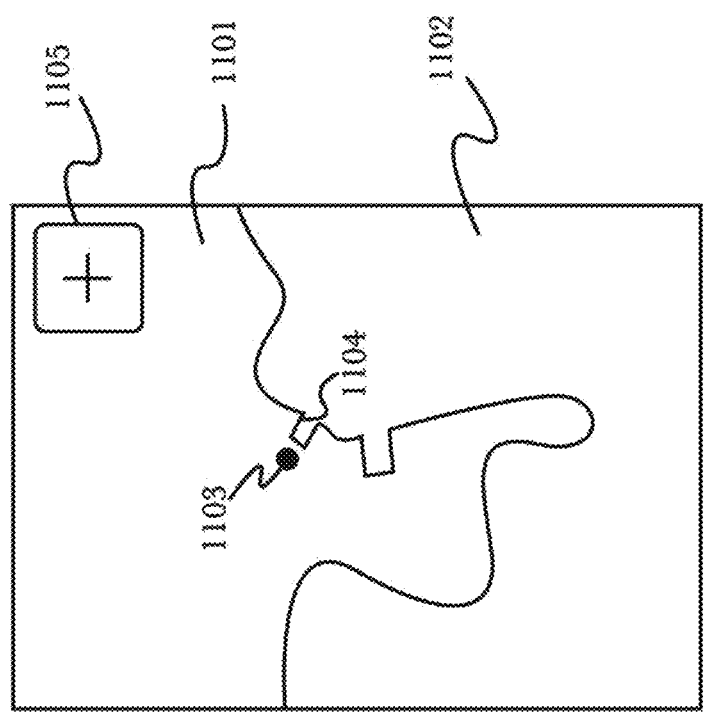

FIG. 11 shows a representation of an exemplary system application screen depicting a boat approaching a dock in a harbor, according to a preferred embodiment of the invention.

Figure 12:
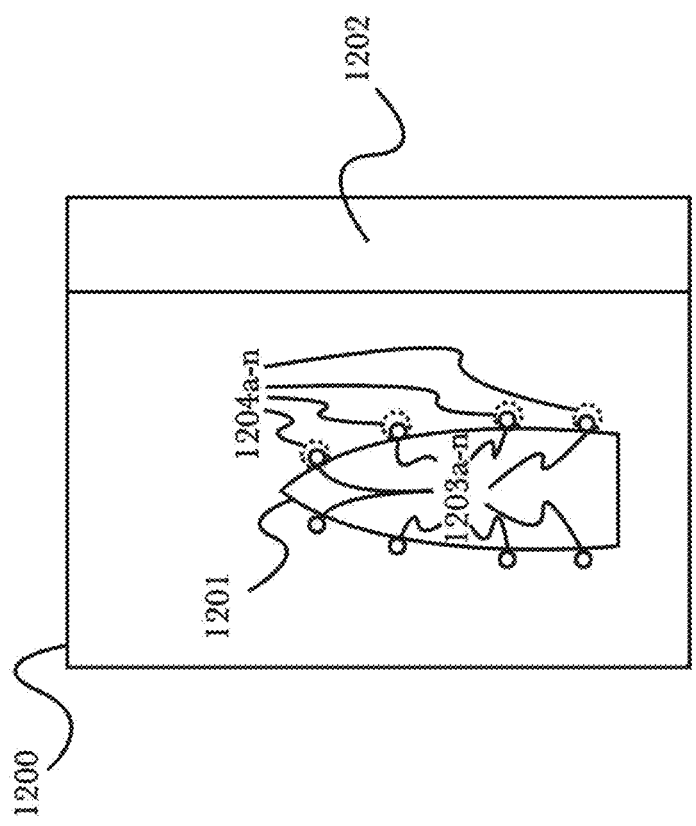

FIG. 12 shows an application screen that is exemplary of additional application functionality according to a preferred embodiment of the invention.

Figure 13:
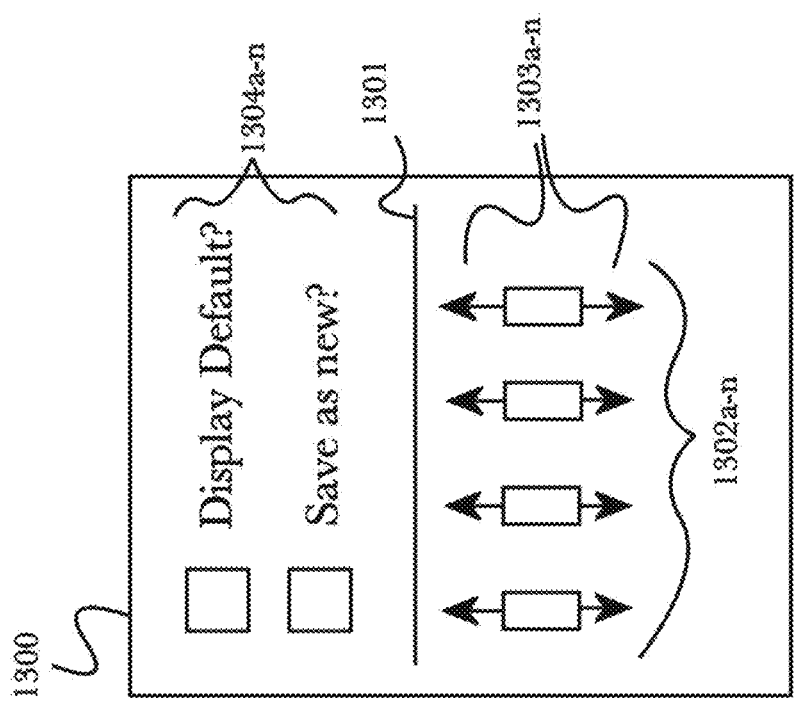

FIG. 13 shows an exemplary application screen that may open when a user has deployed boat fenders according to a preferred embodiment of the invention.

Figure 14:
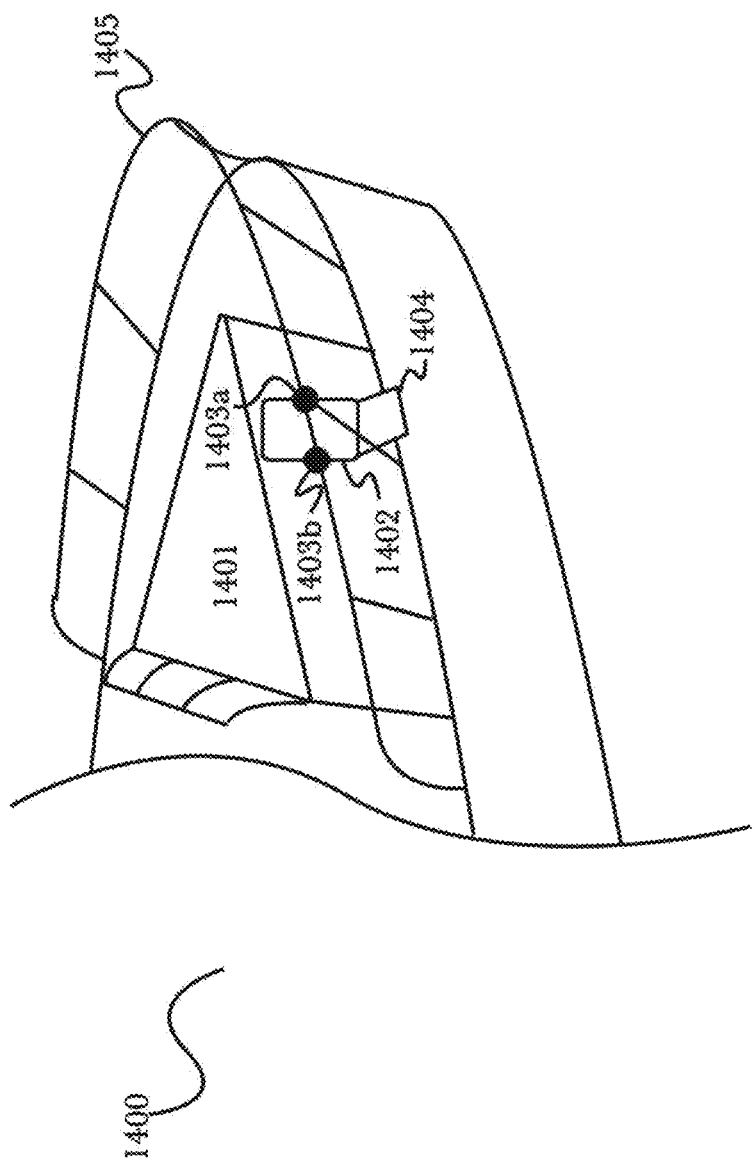

FIG. 14 shows an exemplary representation of a boat prow where the protective enclosure is mounted on one or more hinges according to a preferred embodiment of the invention.

Figure 15:
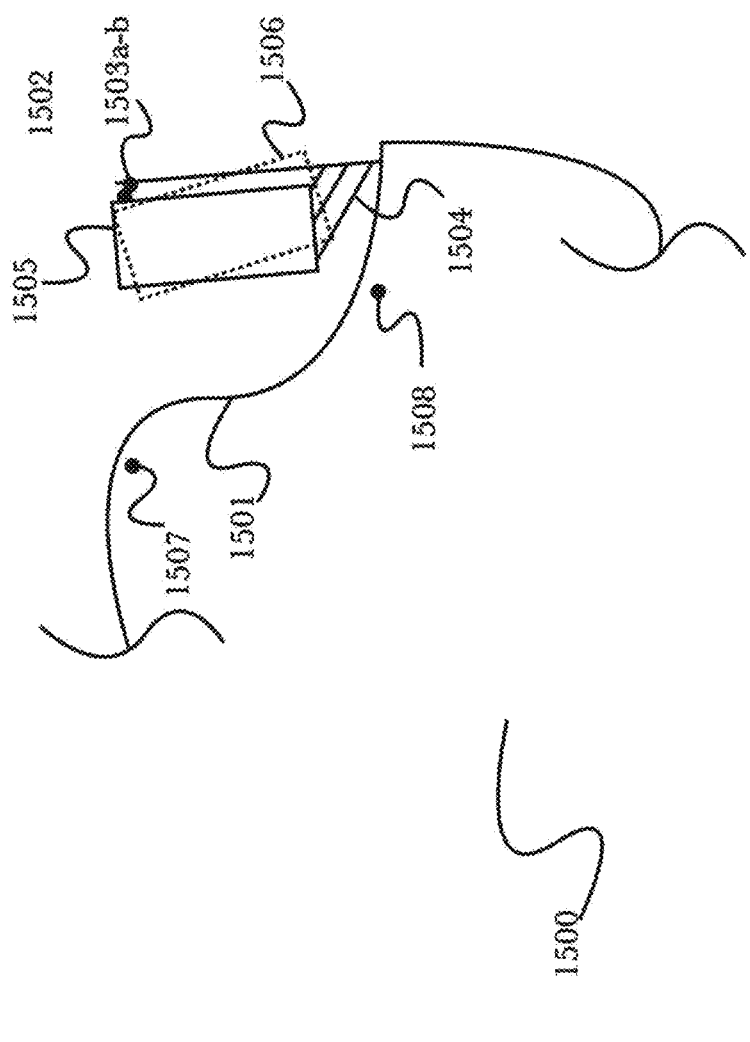

FIG. 15 shows an exemplary cross section of a boat with a representative protective enclosure secured by mounting hinges and a chute that aids in deployment according to a preferred embodiment of the invention.

Figure 16:
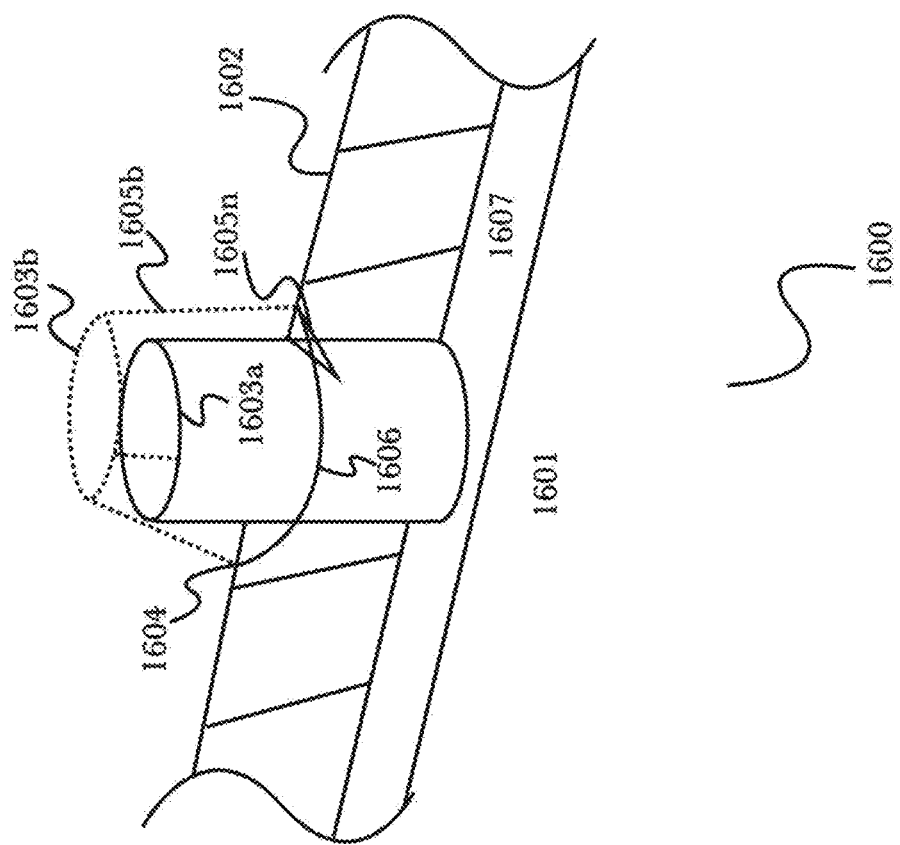

FIG. 16 shows a diagram of an alternative method to recess the protective enclosure according to a preferred embodiment of the invention.

Figure 17:
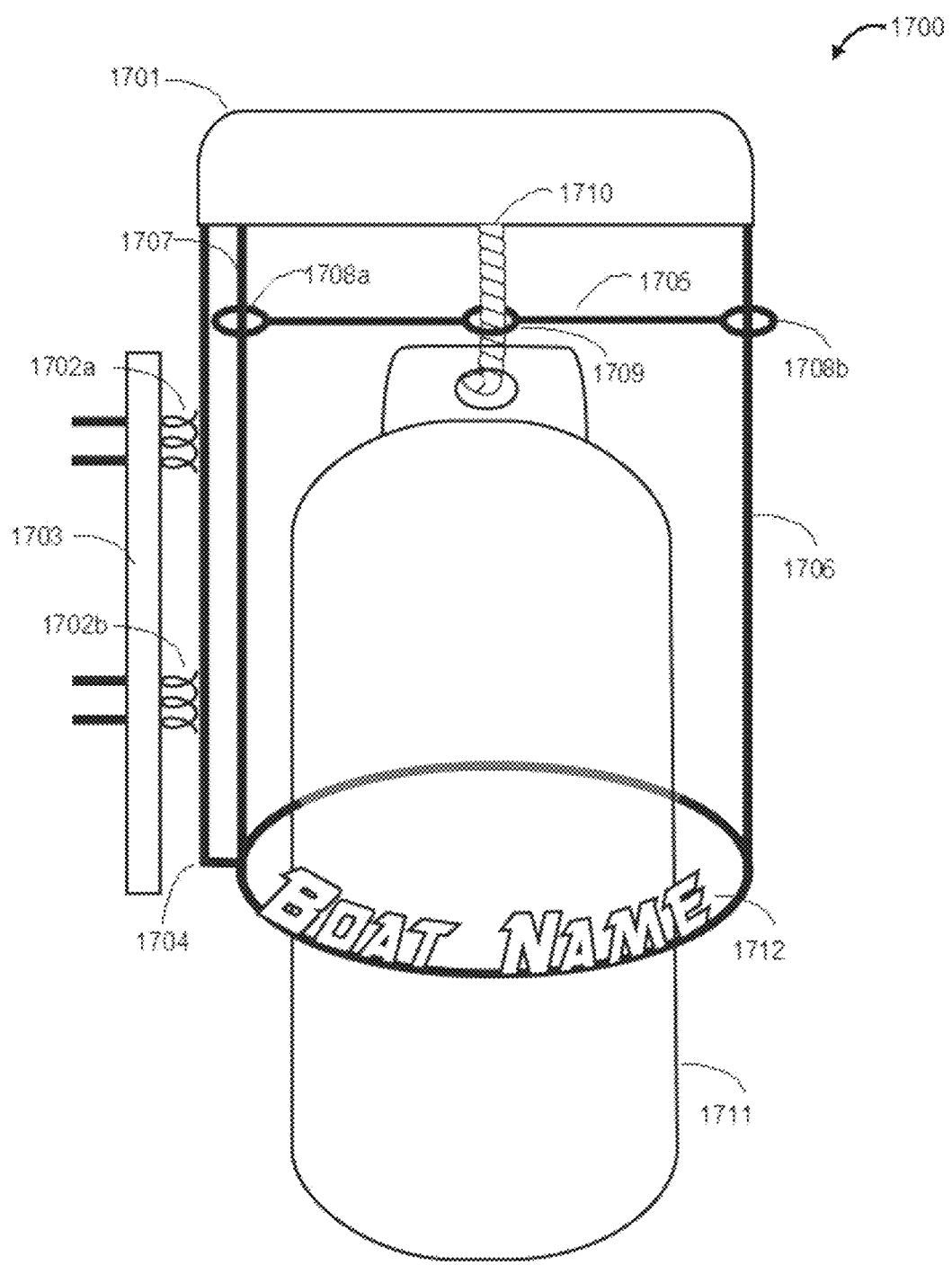

FIG. 17 shows an exemplary representation of an enhanced boat fender enclosure according to a preferred embodiment of the invention.

Figure 18:
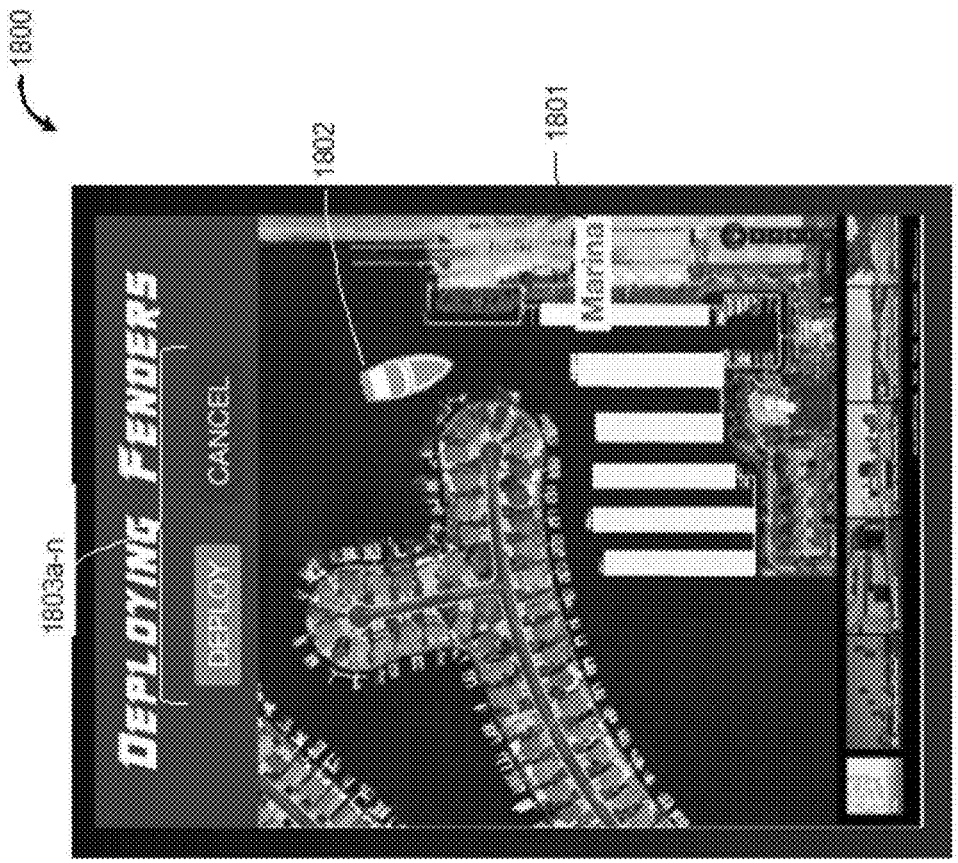

FIG. 18 shows an exemplary fender deployment reminder pop-up screen according to a preferred embodiment of the invention.

Figure 19:
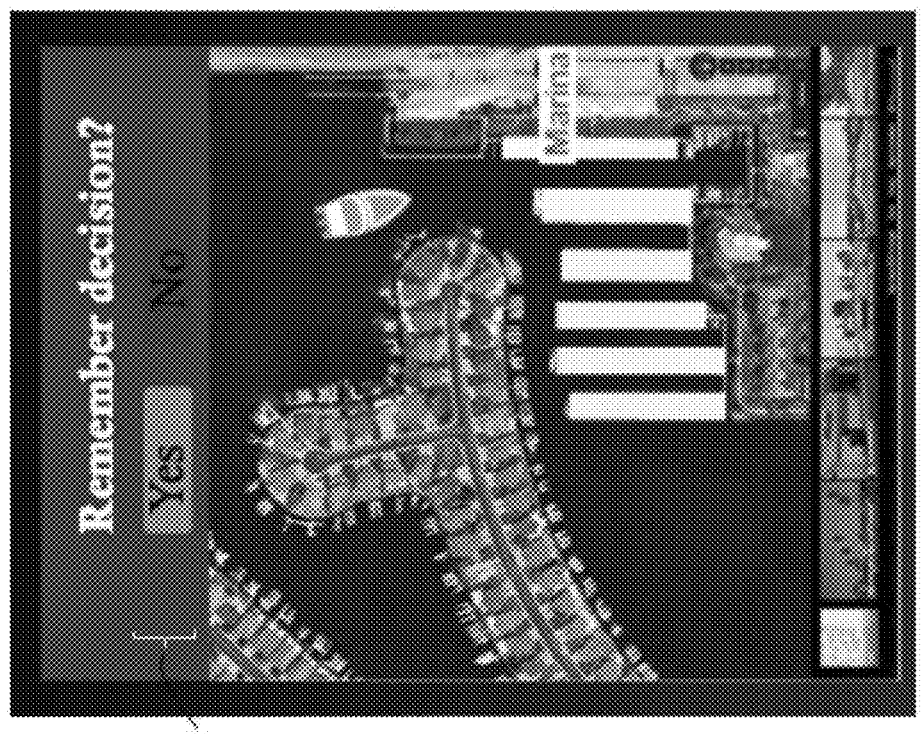

FIG. 19 shows a screenshot in which the system prompts the user whether to remember the decision.

Figure 20:
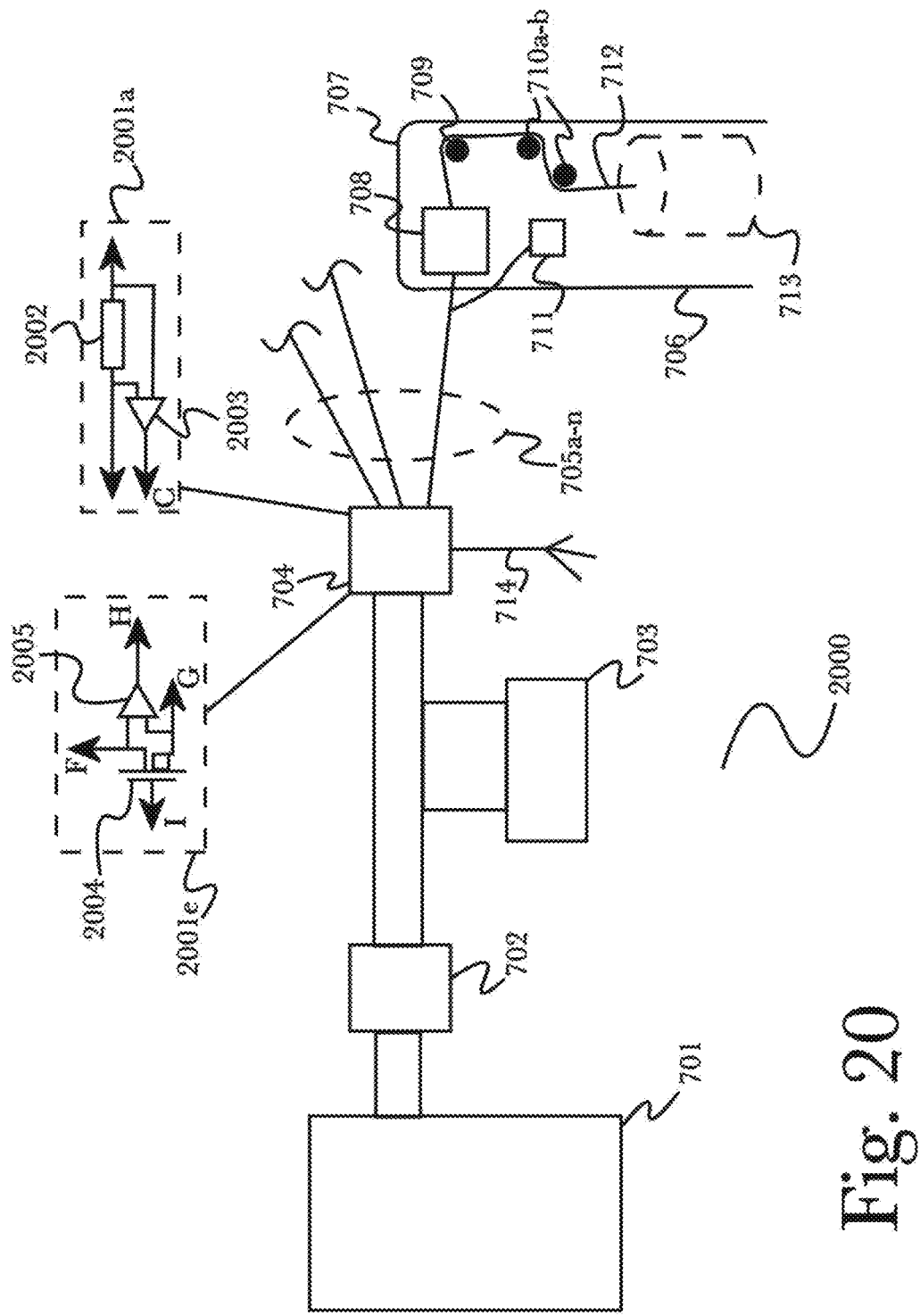

FIG. 20 shows an exemplary representation of two alternative methods for protecting a boat motor and electronic circuitry from overload due to problems with raising a boat fender.

Figure 21:
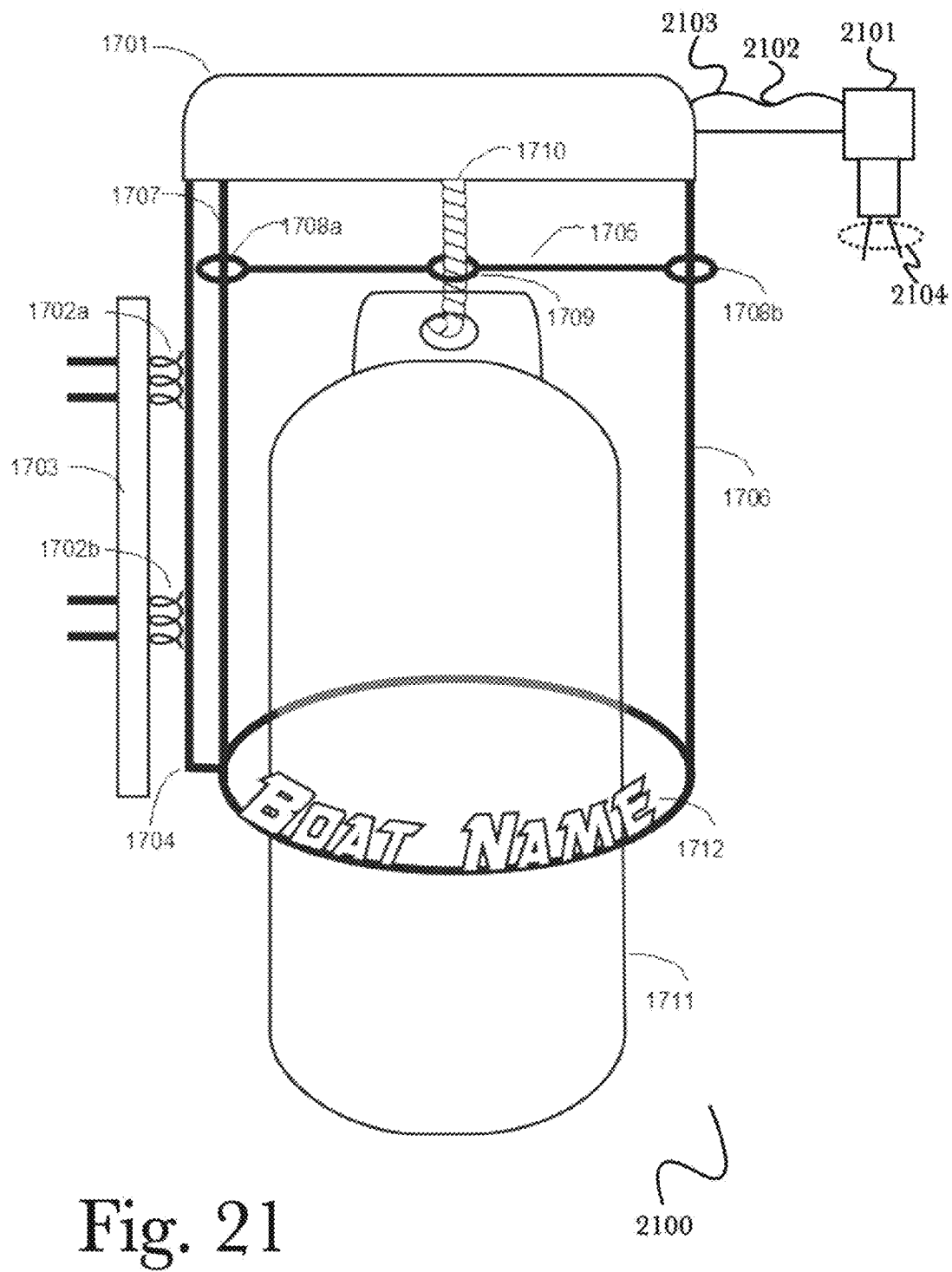

FIG. 21 shows an exemplary representation of an approach for viewing entanglements or other problems preventing a boat fender from being fully raised.

Figure 22:
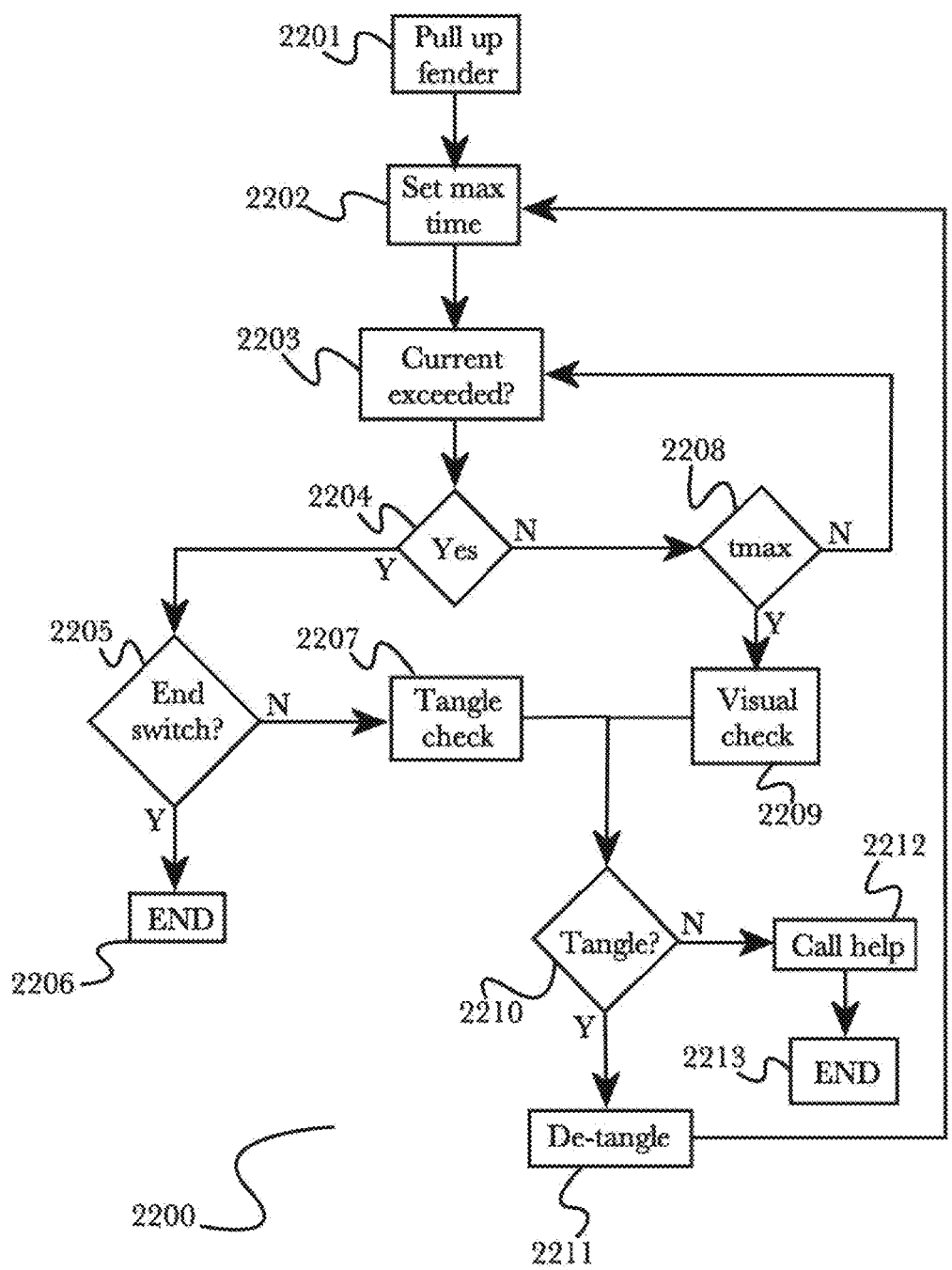

FIG. 22 shows a process for resolving problems with raising a fender.

Figure 23:
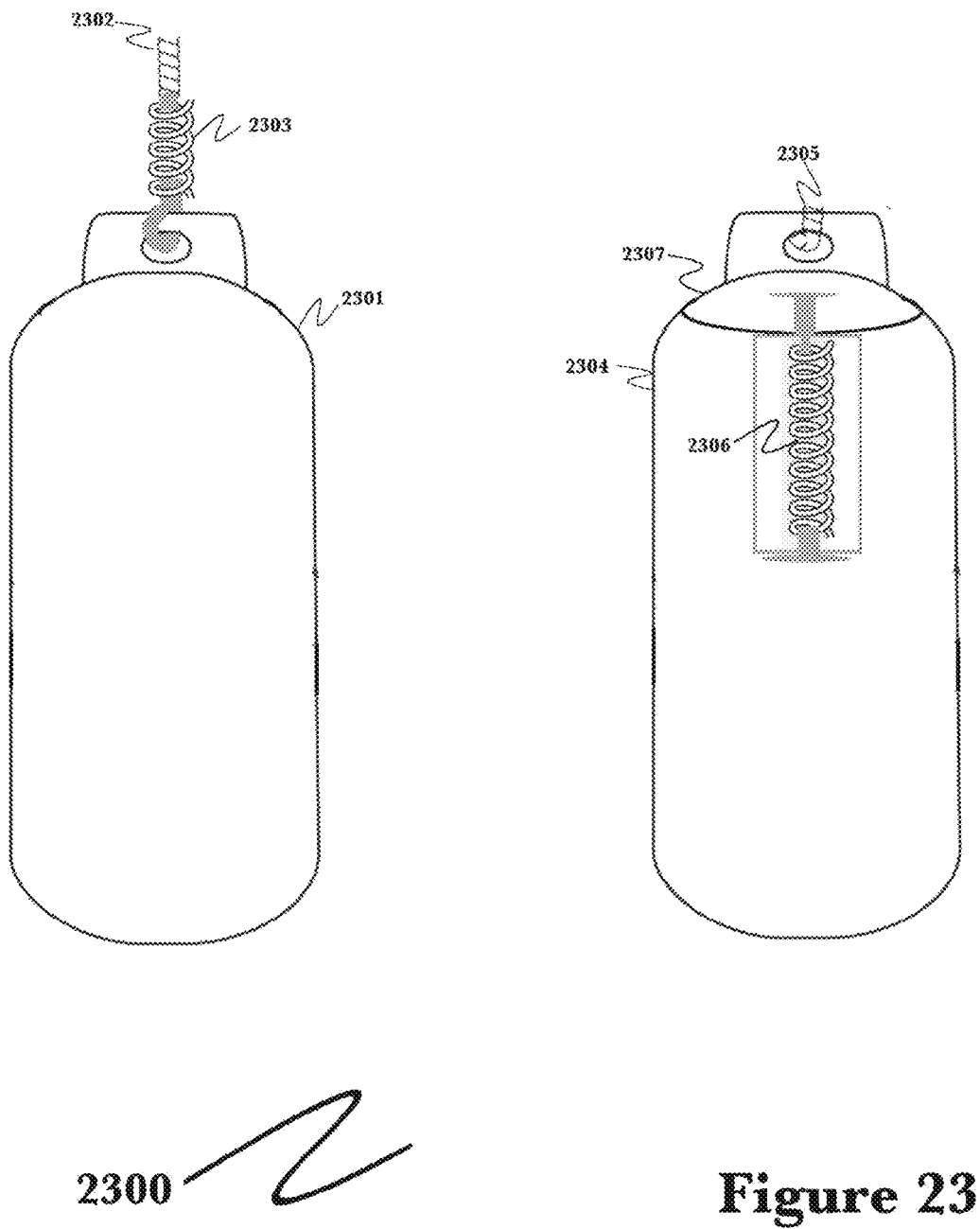

FIG. 23 shows a pair of embodiments with elastic members to mitigate forces transmitted from a fender to a mechanism of the invention.

DETAILED DESCRIPTION

The inventor has conceived, and reduced to practice, an enhanced system and method for remotely deploying boat fenders.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in connection with each other need not be continuously connected with each other, unless expressly specified otherwise. In addition, devices that are in connection with each other may connect directly or indirectly through one or more intermediaries, logical or physical.

A description of an embodiment with several components in connection with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally also work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions for computing equipment or such blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Detailed Description of Exemplary Embodiments

The system and method disclosed herein uses a lift system for fenders, with protective enclosures which are shown as cylindrical for simplicity but may also be triangular, square or polygonal in shape depending on the usage providing secure stowage for fenders when not in use. Additionally, an application on a smartphone may remind the crew to lower the fenders when approaching a dock and possibly, based on previous dockings, a reminder for a mark on the line where to cleat or fast cleat the line, so the fender has the appropriate height for that dock. In some cases the application may provide a reminder or in other cases the application may actually perform the fender deployment operation (as the protective enclosures are motorized in those cases). In most cases the fender is positioned at the same height while docking, but in some situations different heights may be necessary.

In some cases, a protective enclosure for stowing a fender is used, that is sometimes attached to a part of a vessel or boat, and the protective enclosure has an opening for threading through a line (in some cases with a pulley), the line attached to a fender, the line operable by a user to pull up the fender into the protective enclosure through a second opening at the bottom of the protective enclosure. Typically, the protective enclosure has at least one moveable, hinged section, the section formed in such a manner, that when pulling up the fender to the top, the movable section is clamping in on the fender and securing it. In some cases the protective enclosure and the moveable section can be made of a rigid material such as a metal, suitable for marine use. In other cases a majority of the parts are made from a soft plastic material suitable for molding. In yet other cases, the parts of the protective enclosure are made of a combination of rigid metal parts and soft plastic materials. Additionally, in some cases a fast cleat is provided to secure the line in at least two positions, one of which has the fender full retracted and at least one other having the fender deployed, and wherein the fast cleat may be mounted in an easy to reach location on the vessel. Further, an application for use on smart phone can be provided, and the application has access to a third party map system. The application has also access to the GPS system of the smartphone. When approaching a docking site the application can be used by a user to add locations used by the vessel for landing, and the user can enter a mark representing the height of the fenders deployed. In some cases, the application will display and or make heard a reminder to deploy at least one fender, and that display will include the previously stored height mark for deploying the fender. In yet other cases, the protective enclosure for stowing a fender will have a cleat or auto cleat to allow the line to be secured at any position. In some of these cases the cleat is attached to or near the protective enclosure. Furthermore, in some cases the cleat can be released with a controlled jerking of the line. In some cases the line may be routed inside the protective enclosure and exit from the same opening as the fender.

In some other cases, a system may comprise a protective enclosure for lowering one or multiple boat fenders, with the fender attached to a line that is coupled to a winch that is coupled to a motor, with the motor controlled by a controller that may be activated via wireless control signals. Power for the motor may be drawn from a battery, which may be the onboard power supply or, alternatively, may be separately charged from a solar panel. Alternatively, each protective enclosure may have an individual controller, battery, and solar panel, not requiring any wiring between the units.

In some cases, the system and its methods enable these fenders to be controlled from a mobile computing device, such as a smartphone or tablet, both of which should be considered equivalent for all purposes here. Additionally, in some cases, based on repeated visits, the fenders can deploy automatically based on the GPS location of the boat and the fact that its trajectory leads the boat to a landing slip, berth, dock etc.

In some cases, rather than mounting a protective enclosure to the railing, a basket type tube could be integrated into the hull of a boat, similar to a torpedo tube and with or without an outer door protecting the fender when not in use. It may be designed outside the displacement section of the boat hull, thus eliminating complicated locks on the inside, and additionally not requiring waterproofing of the interfaces. For purposes herein, it would be considered essentially equivalent.

In additional cases, in a system with one or more protective enclosures for lowering one or more fenders attached to a line, each protective enclosure may be mounted with one or more hinges so the protective enclosure can swing out from the boat's outline, for easy deployment of a fender. Further, each protective enclosure may be controlled for the swing-out with a lever attached to the boat and used to initiate and stop or reverse the swing-out action of the protective enclosure. This lever may be a hinged arm and may be operated manually or by a motor. In some cases, the protective enclosure may be mounted substantially within the boat's outline and angled so the fender may be lowered through an opening in the railing over the edge of the boat's board. The protective enclosure, in such cases, may also have an additional slide extension at the bottom opening to extension guide the fender over the edge of the boat. The protective enclosure may, in such cases, extend out through an opening in the railing to facilitate easier deployment of the fender, which deployment may be accomplished either manually or with the help of a motor, and the swing-out may be achieved with the help of an additional motor.

In some cases, the winch may feed the unused line into a small basket or storage compartment that will hold the unused section. In yet other cases, a spool maybe used to wind on and store unused sections. In yet other cases, rather than normal line or rope, chains made of metal and or plastic material maybe used, and the winch may have matching grooves that garb the chain links.

In additional cases, the protective enclosure for lowering fenders has a moveable bar or plate across the opening; this bar or plate, which can move along the cylindrical axis of the protective enclosure and is pulled up alongside the fender into the protective enclosure, has a small opening for guiding the line, as well as additional openings or features for guiding itself up and down the protective enclosure. Further, an external force can make the protective enclosure swing back into the hull line, counteracting at least a spring, connected to the hinge, that moves the protective enclosure outside the hull line for normal operations. In some cases, the line may be coupled to a motor-driven winch, with the motor controlled by wired or wireless signals.

Figure 1:
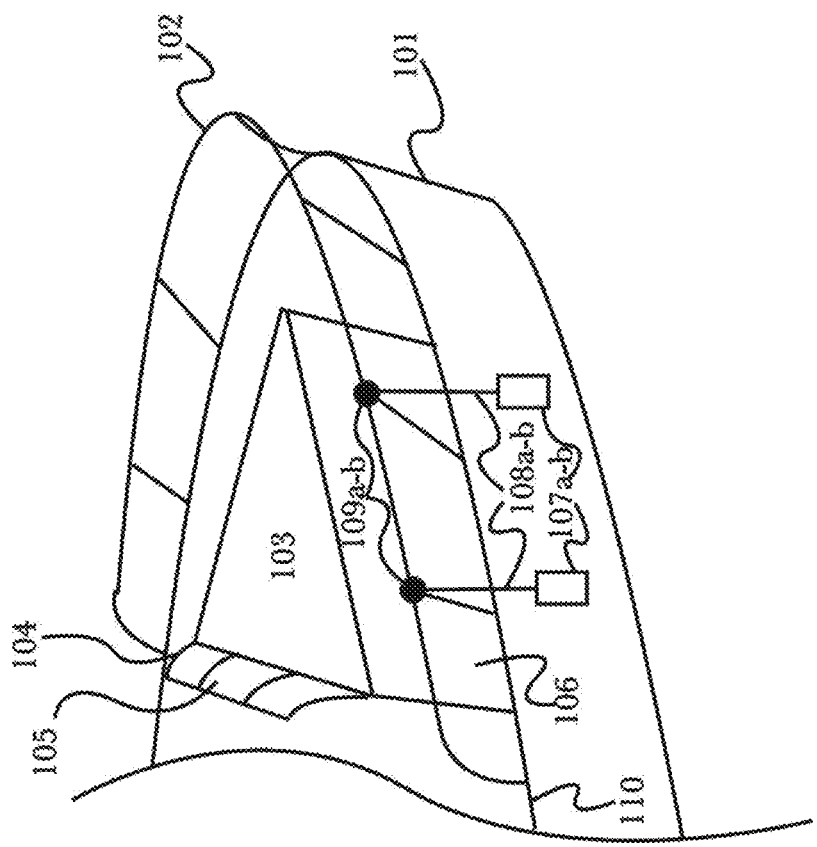
FIG. 1 (PRIOR ART) is an illustration of a typical pleasure boat, illustrating how fenders are normally hung on a boat's railings.

FIG. 1 (PRIOR ART) is an illustration of a typical pleasure boat 100, illustrating how fenders are normally hung on a boat's railings according to the prior art. Two fenders 107a and 107b hang down from the railing, positioned with lines 108a-b held in place with knots 109a-b on railing 102 to protect the boat from damage when the boat makes contact with the dock. During a cruise, the fenders need to be lifted up and securely stowed, as otherwise the wave action could easily rip them off or cause them to damage the boat. Access to the railing for purposes of deploying and positioning fenders from the top of the boat may be difficult and hazardous (particularly in rough seas or inclement weather), because in many cases access is available only from a narrow ledge 106 via a step 110 or from the top of the boat prow 103 using window gate 105 in windshield 104, that window gate being heavy and difficult to open. Boat prow 103 is often of a slick material such as fiberglass coated, in some cases, with marine paint. Further, the surface may in many cases be wet with, in some cases, dust mixed in, and/or the boat may be rocking and jerking in wind and waves, making it even more slippery and more hazardous. From the railing a person must then lean over to deploy and position the fenders.

Figure 2:
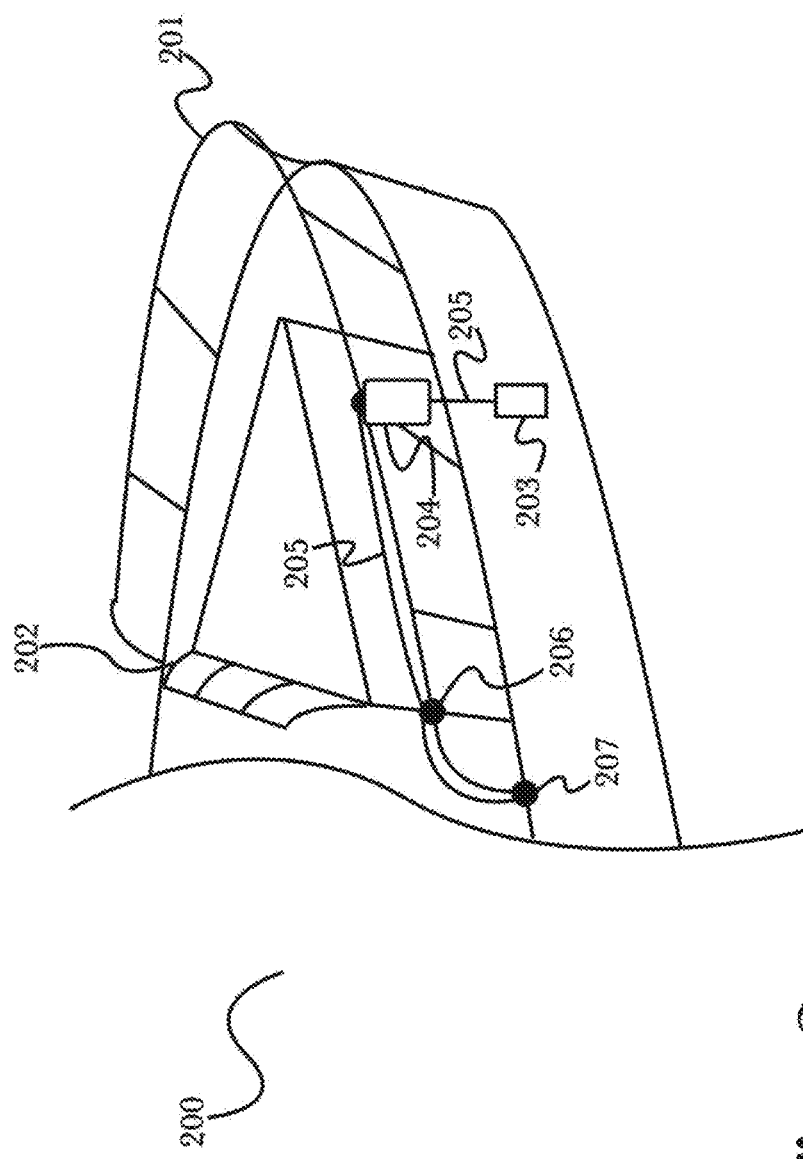
FIG. 2 shows an exemplary representation of an installation of manually-deployed boat fenders, according to a preferred embodiment of the invention.

FIG. 2 shows an exemplary representation of a system 200 of manually deployed boat fenders, with stowage enclosures 204, according to a preferred embodiment of the invention. Windshield 202 has a center partition that can be folded away to reach the boat prow. Attached to railing 201 is fender enclosure 204, which holds fender 203 when the fender 203 is not in use (only one fender 203 and enclosure 204 are shown, for purposes of clarity and simplicity; however, typically, multiple fenders are used). A rope, cable, or similar flexible line 205 (for purposes of this system, rope, cable, and line all shall be considered equivalent, irrespective of constituent material(s)), runs from a position above protective enclosure 204, across pulley 206, to cleat 207, which cleat 207 is used by an operator to secure line 205 in position, which position is often predetermined and marked on line 205. Thus fender 203 may be hauled up into protective enclosure 204 when the boat is undocked and taken out on the water, and fender 203 may be deployed (lowered) when the boat approaches a dock.

Figure 3:
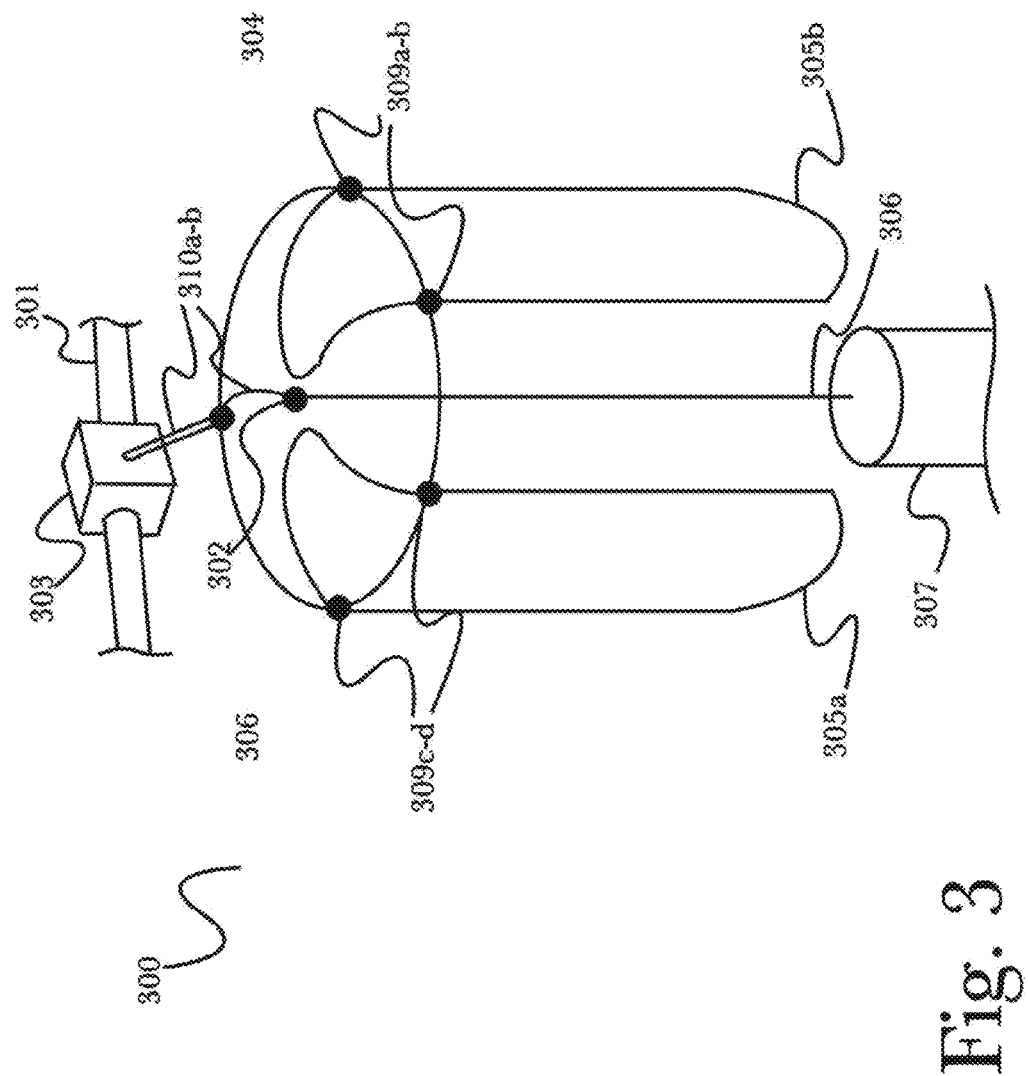
FIG. 3 shows an exemplary representation of a fender stowage enclosure according to a preferred embodiment of the invention.

FIG. 3 shows an exemplary representation of a fender stowage enclosure 300 as shown on FIG. 2 according to a preferred embodiment of the invention. Attached by clamp 303 to railing 301 is a holder 310a that holds ring 304, which in turn holds protective enclosure 204, plus a pulley (or ring) 302, via holder 310b, the pulley 302 used to redirect line 306 when it comes up. In this example two sections (or segments) 305a,b are hinged at the top with, respectively, hinges 309c,d and 309a,b. Hinges 305a,b are attached to ring 304. When fender 307 is pulled up on line 306 across pulley 302, the tips of hooks 308a,b cause the extensions at the bottoms of sections 305a,b to clamp the fender 307 in place, as the hinge lever action causes the bottom ends of sections 305a,b to pull in. In some cases, protective enclosure extension 305a,b may be made of plastic; in other cases, they may be made of some suitable material resistant to corrosion, such as, for example, chrome-plated wire. In yet other cases, the bottom end maybe be flaring (not depicted), allowing for an easier insertion of fender 307; in other cases it may be hooked inward (not depicted), providing additional securing of fender 307 when stowed. Also, in additional cases, rather than two sections, three, four or more sections maybe used.

FIG. 4 shows an exemplary representation of a pulley and remote cleat mechanism 400 for the safe and convenient stowage and deployment of boat fenders 400 according to a preferred embodiment of the invention. Line 402 comes in from the protective enclosure 406 on railing 401 and goes through pulley wheel 404, which is attached to pulley block 403. At the pulley, line 402 is redirected to cleat 405. In some cases, double or triple pulleys maybe used as often more than one fender is used. Also, instead of regular cleats, fast cleats and multi-line fast cleats maybe used for easier use.

Figure 5:
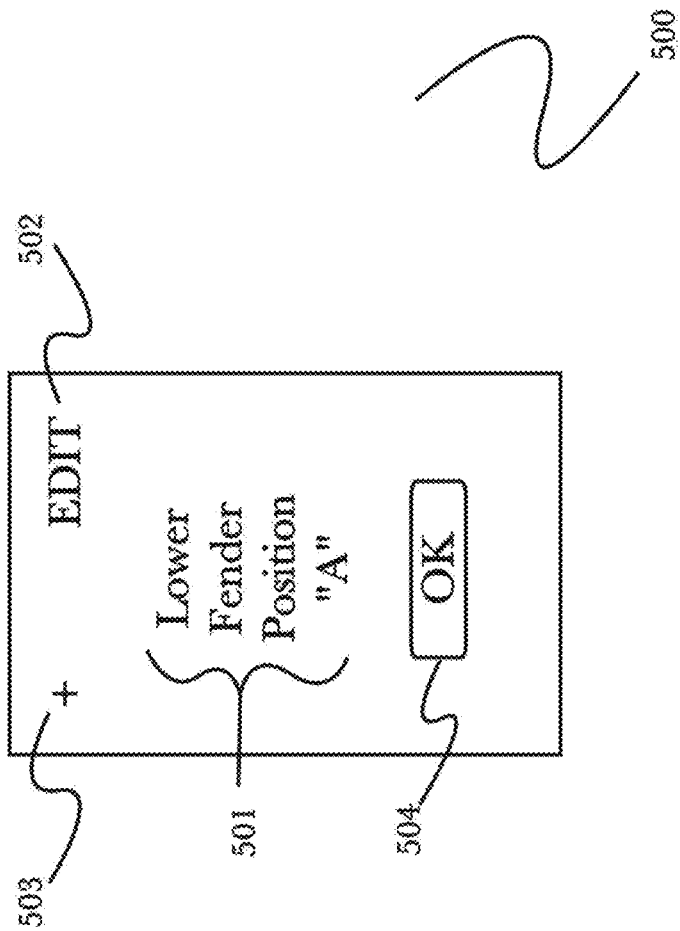
FIG. 5 shows an exemplary representation of a user reminder app for boat fender deployment according to a preferred embodiment of the invention.

FIG. 5 shows a popup screen of reminder app 500. It uses high-accuracy marine maps such as, for example those provided by NAVIONICS™, to determine whether the boat is about to dock, and notifies the user with message 501 (and in some cases an acoustic alert) of the position to which the lines need to be lowered. Also shown are buttons to add new positions "+"503 based on current GPS location, to set the height, and to "edit" 502 for modifying an existing height, for example, or delete a previously stored location. Further, an OK button 504 enables the operator to confirm and/or close the alert and mute an acoustic signal.

FIG. 6 shows an exemplary representation of a system 600 where the connection of four protective enclosure and fender mechanisms connected by wires to a solar panel 604 according to a preferred embodiment of the invention. Four protective enclosures 602a-d are attached to railing 601. Wires 605a-d connect the enclosures to solar panel 604, which is also attached to railing 601. Beneath solar panel 604, and connected to it, are a controller and a battery (not shown here). Fender 603d (only one fender shown here, for clarity and simplicity) is shown as it may be deployed, with multiple dotted lines to indicate that the fender may be deployed at any of multiple heights. It is clear that a boat may carry more than four protective enclosure-fender units, and they are typically deployed all along an engaged side of the boat, from prow to stern; however, for clarity and simplicity, only four are shown as positioned here.

FIG. 7 is a diagram of a system 700 with a solar panel assembly connected to a basket and fender mechanism (as shown in 604) according to a preferred embodiment of the invention. Panel 701 connects to charge control unit 702. Unit 702 is an existing commercial product that is readily available. Often unit 702 may be integrated into a junction box at the rear of panel 701. Battery 703 may be any of various types of battery known in the art, such as, for example, lead-acid, lead-acid gel, lithium, lithium ion, LiFePO4, NiCd, NiMh, or any other suitable type, depending on which is best and most suitable for its situation. System controller 704 has an antenna 714 and wires 705a-n leading to the baskets. Exemplary basket 706, connected to box 704 via wire 705x, contains fender 713, shown in a dotted line to indicate that it is not externally visible. Line 712 goes over two pulleys 710a, b to winch 709 that is attached to motor 708. Casing 707 protects assembly elements, including 707, 709, 710a,b, 711, and 712 against water, collision, injury of persons nearby, etc. When fender 713 is retracted, switch 711 signals to controller 704 when the fender is fully retracted. In some cases, a smaller solar cell and smaller controller may be mounted on the top of the basket, omitting the need for wires such as wire 705x. Typically wire 705x uses a four-lead wire, that is, two for the motor and two for the switch. In other cases, instead of using a solar panel to power the system, controller 704 may be powered from the boat's power supply. In yet other cases, the assembly contained in case 707 may be installed centrally and the line may be pulled as shown in FIG. 2 to a location with multiple motorized winches. Also, in lieu of using a mechanical switch 711, optical means, both transmissive and reflective, may be used, or simply a change in current of the motor that the controller can detect and use as an indicator of too much resistance, either at the end or if fender is caught somehow. All these exemplary variations, and other, similar variations, shall not depart from the spirit of the system and method disclosed herein.

FIG. 8 is a diagram of an exemplary controller for the deployment and retraction of fenders 800, according to a preferred embodiment of the invention. Power supply input 802 may come from a local battery, a shipboard battery, or some other power source. Controller 801 has a microprocessor 806, typically a system on a chip with memory 807 and nonvolatile memory 808, which nonvolatile memory contains software 809a-n, including an operating system as well as actual commands for the system. Input/output unit 810 may pair the radio 811 with a smart phone. Radio 811 connects to microcontroller 806 as well as to antenna 812. The connection between radio 811 and a smart phone may be via, for example, Bluetooth, Wi-Fi, or both, as needed. Power switch unit 803 distributes power to all these devices, as well as controlling output power through switches 804a-n, thus enabling the winches to extend lines to extend or retract the fenders. Switch unit 803 also has the input sensors for the switches in the protective enclosures for extending or retracting the fenders.

FIG. 9 shows an exemplary overview of a computer system 900 as may be used in the system and method disclosed herein. It is exemplary of any computer that may execute code to process data. Various modifications and changes may be made to computer system 900 without departing from the broader spirit and scope of the system and method disclosed herein. CPU 901 is connected to bus 902, to which bus is also connected memory 903, nonvolatile memory 904, display 907, I/O unit 908, and network interface card (NIC) 916. I/O unit 908 may, typically, be connected to keyboard 909, pointing device 910, hard disk 912, and real-time clock 911. NIC 916 connects to network 914, which may be the Internet or a local network, which local network may or may not have connections to the Internet. Also shown as part of system 900 is power supply unit 905 connected, in this example, to ac supply 906. Not shown are batteries that could be present, and many other devices and modifications that are well known but are not applicable to the specific novel functions of the current system and method disclosed herein. Also present, but not shown in detail, as part of I/O unit 908, for example, with local wireless connections, such as BLUETOOTH™, WiFi, ZIGBEE™ etc. Further, in many cases, a GPS receiver is used to provide for location services.

FIG. 10 is an exemplary diagram of a wireless control system 1000 for deployment and retraction of boat fenders, according to a preferred embodiment of the invention. Controller 1001, which is functionally equivalent to controller 704, described above in the discussion of FIG. 7, has an antenna 1002 and also the software and other components required to control fender deployment operations as previously described. Controller 1001 may connect to a dedicated control unit 1003, which unit may have a set of buttons 1004a-n, such as, for example, two rows of buttons 1004a-n as shown here. Each button has a separate assigned function, such as controlling the raising or lowering of one or more fenders. General controls 1005a-n may, for example, indicate the status of certain system functions, such as, for example, power state and the state of connectivity to wireless network 1006, which network may use Bluetooth, Wi-Fi, or some other similar connection protocol. Controls 1005a-n may also control functions such as raising or lowering all fenders or certain combinations of fenders, such as all fenders on one side, for example. As an alternative control unit, system 1000 may use a smart phone, such as, for example, phone 1010, on whose touch screen 1013 the user can control the functions of specialized software 1011a-n. Software 1011a-n is specific to system 1000 and typically may be downloaded from an app store supplying software for the particular model of phone 1010. Software 1011a-n can communicate with controller 1001 via connection 1012, which may be Bluetooth, Wi-Fi, or some other similar connection protocol. Connection 1014 enables phone 1010 to communicate with geo-positioning satellites 1015a-n, using any of various global positioning systems (GPS) supported by phone 1010 and available currently or in the future.

FIG. 11 shows a representation of an exemplary system application screen 1100 depicting a boat approaching a dock in a harbor according to a preferred embodiment of the invention. In this example, a boat 1103 is in water 1101, approaching dock 1104, which dock extends from land 1102. When boat 1103 comes within a certain predetermined distance from dock 1104, an indicator 1105 appears on application screen 1100. The boat's position, in this example, is determined by high-accuracy navigational mapping software (not shown here) as mentioned in the description of FIG. 5. Indicator 1105 enables a user to open addition application menus with additional functionality.

FIG. 12 shows an application screen 1200, accessed using indicator 1105 that is exemplary of additional application functionality according to a preferred embodiment of the invention. In this example, boat 1201, viewed from the top, approaches dock 1202. Screen 1200 shows all boat fenders 1204a-n, of which in this example there are eight. Those fenders on the side approaching dock 1202 may be indicated, for example, by halo buttons, that is, buttons showing a halo around the fender indicating a possible user interaction. Screen 1200 may also contain an additional button (not shown here) that enables a user to control multiple fenders, such as, for example, all fenders together, all fenders on the side of the boat approaching the dock, all front fenders, all rear fenders, etc.

FIG. 13 shows an exemplary application screen 1300 that may open when a user has deployed boat fenders as described in the discussion of FIG. 12, according to a preferred embodiment of the invention. Represented on screen 1300 is one side 1301 of the boat, with fenders 1302a-n. Above and below fenders 1302a-n are arrows 1303a-n, indicating fender movement up or down. Buttons 1304a-n give a user control of general functions, such as, for example, deploying all fenders to a default position or saving a manually controlled position as a new default position. Individual fender positions may be manually controlled by pressing any of arrows 1303a-n to adjust any one fender up or down as desired. When the fenders are all adjusted for a certain dock, the user could then save the fender positioning as a new default for this location, so the next time the user goes to approach this particular dock, the fenders can be deployed automatically to the saved positions when the boat comes within a certain predetermined distance from the dock.

FIG. 14 shows an exemplary representation of a boat prow 1400 where a protective enclosure 1402 is mounted on one or more hinges 1403, according to a preferred embodiment of the invention. This figure shows many structures found at the prow of the boat, including railing 1405, prow 1401 with cabin windows, and other features. Exemplary enclosure 1402 is, in this example, mounted behind railing 1405, with mounting hinges 1403a, b on the inside of railing 1405. Chute 1404 is attached to protective enclosure 1402, so the fender within protective enclosure 1402 may slide down against the boat side. Deploying and retracting the fender may be done manually, with, for example, a line, or by a motor. In some cases, chute 1404 may have a small lip, so the fender can easily be retracted back up into protective enclosure 1402. In other cases, chute 1404 may be recessed behind the farthest extension of the outward vertical curve of prow 1400, thus not protruding into the line of travel (up and down) of the fender.

FIG. 15 shows an exemplary cross section 1500 of a boat 1501 with a representative protective enclosure secured by mounting hinges and a chute that aids in deployment, according to a preferred embodiment of the invention. The outlines of boat 1501, prow section 1507 on top, walkway 1508 behind the railing, and the hull are all, for reasons of clarity and simplicity, very simplified. Protective enclosure 1502, secured by mounting hinges 1503a, b, and chute 1504 are slightly behind the outermost part of the hull of boat 1501, because fender 1505 is heavy enough to slip over the edge of boat 1501 when it is deployed. Deploying and retracting fender 1505 may be done manually, with, for example, a line, or by a motor. On the other hand, when fender 1505 is retracted, because there is no edge of chute 1504 protruding beyond the hull, fender 1505 can easily slip back up chute 1504 and into protective enclosure 1502. Outline 1506 shows an alternative protective enclosure 1502 position, wherein protective enclosure 1502 may be hinged around the railing so that during deployment and retraction of fender 1505, the protective enclosure bottom tilts slightly outward.

FIG. 16 shows a diagram of an alternative arrangement 1600 by which protective enclosure 1603 may be recessed, according to a preferred embodiment of the invention. Shown are walkway 1607, behind railing 1602, and prow 1601. Railing 1602 has a notch or bay 1606 in the inner edge so fender protective enclosure 1603 can retract in large part behind the outline of the railing. In this example, hinge 1604 enables protective enclosure 1603 in position 1603a to swing out into position 1603b. Arm 1605, shown in position 1605a retracted and in position 1605b extended, may be operated manually, with, for example, a lever or knob, a line, a spring or by a motor, and the like.

Deploying and retracting the fender (not shown here) may also be done manually, with, for example, a line, or by a motor, as described earlier herein. Arm 1605, in extended position 1605b, pushes protective enclosure 1603 into position 1603b, so the fender can deploy vertically without hitting the deck or railing. In some cases, such a bay or notch 1606 may be flanked by one or two posts, enabling additional hinges to further control the swing of protective enclosure 1603 (not shown). Once the fender is deployed, arm 1605 may retract protective enclosure 1603 to a position behind the boat's outline.

FIG. 17 shows an exemplary representation of an enhanced arrangement 1700 of boat fender protective enclosure 1701 according to a preferred embodiment of the invention. Protective enclosure 1701 has a mechanism for winding up line 1710 to retract fender 1711. The hinge allowing protective enclosure 1701 to swing in behind the hull line is comprised of springs 1702a and 1702b. These springs move protective enclosure 1701 outside the hull line for normal operations. Although this example shows two springs 1702, it is clear that other arrangements may have more or fewer springs 1702. These springs (1702a-n) hinge between bar 1703, which attaches typically to a vertical railing post or other suitable fixed object(s) on the boat, and protective enclosure rail 1704 (part of the enclosure structure 1700). Moveable bar 1705 has three openings. These openings 1708a and 1708b are at each end, for riding up and down protective enclosure bars 1707 and 1706, as well as one opening 1709, which is roughly in the center, for guiding line 1710 to which fender 1711 is attached. In the fully extended position, moveable bar 1705 is stopped at the bottom end of the protective enclosure, across the protective enclosure opening. As the fender 1711 is retracted, it catches moveable bar 1705 when it reaches opening 1709 and pushes bar 1705 up as fender 1711 is fully retracted, bar 1705 being moveable along the cylindrical axis of protective enclosure 1701. While use of a bar is one preferred, embodiment of guiding the fender through the protective enclosures, those skilled in the art will realize that other structures such as, but not limited to a plate-like cap (not shown for simplicity of illustration) or a cage that encloses the top portion or all of the fender and expands to accept the fender at the opening of the protective enclosure and then collapses to enclose it (not shown for simplicity of illustration) as the fender enters the enclosure, could also be used. Likewise, these guiding structures, bar, plate or cage may themselves be guided along the cylindrical axis of the protective enclosure using one or more tracks located on the side walls of the enclosure into which parts of the guiding structures fit instead of through the use of openings 1708a and 1708b and bars 1706 and 1707 within the protective enclosure 1701 (not shown)

Optionally the boat name 1712, in alphanumeric characters, may be applied in desired color(s) and finishes. In some cases protective enclosure 1701 may contain a camera (not shown) that provides a close-up view of the pier to the controlling tablet and or smartphone, helping to "fine-maneuver" the boat into the desired docking position.

FIG. 18 shows an exemplary fender deployment reminder pop-up screen 1800 according to a preferred embodiment of the invention. When approaching a marked location, such as a previously visited landing place. In this example as boat 1802 enters marina 1801, the question of whether to deploy or not, if no prior default was set, appears at the top of screen 1800. The user can then issue the command by clicking either one of the response buttons 1803a-n. Although this example shows two buttons 1803, there could be more, such as, for example, more than one deploy button, one for the standard height, and one or more for other options.

FIG. 19 shows a screenshot 1900 in which the system prompts the user whether to remember a decision regarding fender deployment. Specifically, the system prompts the user whether to remember the decision from screen 1800 for the next time the vessel approaches the same location, by selecting either one of the response buttons 1901a-b.

FIG. 20 shows a modified version of FIG. 7, according to one aspect of the system and method described herein. Added to controller 704 are two optional extensions. In configuration 2001a measuring resistor 2002 has been inserted in series with motor 708. Sensing amplifier 2003 delivers a sensing voltage to point C. Once a certain current has been exceeded, the sensing voltage triggers a motor shut-off by notifying the shutoff circuitry in the controller, typically in a way similar to the way shutoff switch 711 is notified. This approach can sense if the motor is over-loaded and can protect the batteries, the motor, and the driving transistors or relays. It can also be used to shut off the motor in the case of an entanglement, such as, for example, a tangle in the line or rope that pulls up the fender, or if the fender is somehow tangled below the basket and cannot be pulled up. Of course, it will be appreciated by one having ordinary skill in the art that other problems may occur that prevent a fender from being fully retracted; for example, due to boat motion caused by water waves, a fender may fail to properly enter the basket because of misalignment or rotation of the fender. Thus this approach can protect the line from being torn and the fender lost at sea. Alternative configuration 2001e, shows, instead of an added resistor 2002, that the switching transistor 2004 driving motor 708 between contact points F and G is used as the measuring resistor, and the amplifier 2005 drives the voltage H. Also, point I drives the transistor. Both configurations 2001a and 2001e are commonly used approaches to measuring currents or protecting motors and/or other circuitry elements from overload and are not novel in and of themselves. However, the use of motor overloads to detect entanglement with respect to the fender, and in particular to aid with untangling, is novel.

FIG. 21 shows a modified version of FIG. 17, according to one aspect of the system and method described herein. In approach 2100, camera 2101 is attached by stick 2102. Wire 2103 connects to controller box 1701, enabling transmission of images from the camera to show when the fender is lowered. When there is a problem raising the fender, camera view field 2104 can observe the state of the fender, such as, for example, if the fender is stuck on the sea bottom, if the fender line is tangled, etc. It is clear that wire 2103 could be run within stick 2012, or the camera could be placed in a bulge out of the top of controller 1701, etc. Various different cameras and viewing angles may be used to provide the best views of a problem. It is not necessary in all cases that the camera explicitly observes a tangle. It can be used, for example, simply to see whether the protection circuitry described above in the discussion of FIG. 20 has stopped the motor due to difficulty in raising the fender. In some cases, visual recognition software may be embedded in the camera module or in the central controller, so the system can identify either a tangle or a lack of motion of the fender, which, when the motor should be in motion, indicates highly likely a tangle or similar problem.

FIG. 22 shows an exemplary process 2200 for resolving problems with raising the fender, employing the two novel approaches disclosed above in the discussions of FIGS. 20 and 21, according to one aspect of the system and method disclosed herein. In step 2201, the system receives a command to pull up the fender. In step 2202, the system sets a maximum time to attempt to pull up the fender, and in step 2203, the system monitors the time to determine when the current attempt exceeds the preset maximum time. If, in step 2204, the system determines that the current attempt has exceeded the preset maximum time, in step 2205 the system checks to see if an End switch, such as, for example, switch 711 described in the discussion of FIG. 7, is activated, signaling that the fender is fully retracted. The inventor envisions that various switching means may be used as an End switch 711 according to the invention; for example, conventional contact-based electrical switches, radio frequency identification (RFID) proximity switches, mechanical switches, magnetic switches, or any other similar means of detecting when a fender is fully retracted. Additionally, more than one end switch may be utilized in some arrangements, for example to increase reliability if the fender is retracted at an angle, or to provide redundancy should any single switch fail (for example, due to damage to the receptacle). If the End switch is activated, indicating that the fender or movable bar is fully retracted, in step 2206 the process ends. However, in step 2205, if the system detects that the End switch is not activated, in step 2207 the system initiates a check for a tangle in the fender line. In step 2210, the system checks to determine the number of tangle checks, such as, for example, the first occurrence of a tangle check, or any number up to a preset maximum. Typically, only one or two attempts to detangle would occur, to avoid damage to the equipment. If, in step 2210 the detangle attempts do not exceed the preset limit, in step 2211 the system attempts to detangle the line, typically by a little tug or pull on the line, as would be done manually. After each detangle attempt in step 2211, the system returns to step 2202 to repeat the process. If the maximum current is not exceeded in step 2204, then in step 2208 the system again checks to see if the maximum time or number of attempts has been exceeded. If the detangle attempts fail repeatedly, in step 2209 the system attempts a visual check of the fender, using the camera as described in the discussion of FIG. 21. When the visual check is finished, the system once again attempts a detangle. If all system detangle attempts fail, the system issues a call for operator help in step 2212, and in step 2213 the process ends. Different strategies for detangling may be used, for example resulting in controlled jerking of the line and or the fender in order to resolve the tangle or jam. There may also time limits for individual sets of detangling and overall attempts in order to protect the components of the system from overload/damage. Further, failure to complete retraction may result in an alert sent to an operator or other predetermined location or person.

In some cases, in a system with a basket and a mechanism for stowing a boat fender, upon retracting the fender, the system shuts off the motor if an over-current arises due to a tangle in the line or a catch of the fender below the basket. Upon such a shutdown of the motor, the system engages in a limited number of small reversals in an attempt to detangle the line and/or the fender and achieve a full retraction. Additionally, a camera and visual recognition software may be used to detect a tangle or other problem with the line or the fender, in addition to the current sensing. Further, upon attempting to retract the fender, the motor shuts off if a disturbance in the retraction motion is recognized by the visual recognition software due to a tangle in the line or a catch of the fender below the basket. In such cases, the system engages in a limited number of reversals to attempt to detangle the line and or the fender and achieve a full retraction. Moreover, the current control may be used to aid the detangling control of the reversal of the line motion in addition to the camera. Different strategies for detangling may be used. There may also time limits for individual sets of detangling and overall attempts in order to protect the components of the system from overload/damage. Further, failure to complete retraction may result in an alert sent to an operator or other predetermined location or person.

FIG. 23 shows exemplary embodiments of the invention adapted to provide heavy swell protection for boat fender system 2300. During the course of boat use, storms or other disturbances may occur that result in the production of heavy swells or waves. These swells can possess enough energy to damage the machinery of either manually operated or motor operated fender systems, particularly when sudden movement of a vessel causes substantial tension to be applied suddenly to any cable holding a fender in place, thereby placing large and sudden stresses on the machinery of fender systems. The effects of heavy swells may operate both while the fenders are retracted—where the confines of the protective enclosure can serve to exacerbate the strength of the swell—and while the boat is docked—where the swells can exert significant tugging pressure or the fender can get caught between the dock and hull of the boat moving independently of each other, again tugging at the fender with significant force. According to the embodiments shown in FIG. 23, mechanisms that use elastic members situated between a fender 2301 and a line 2302 act to mitigate these forces before damage occurs to the rest of the system. In a preferred embodiment, boat fender 2301 is attached to a spring 2303, and the other end of the spring attached to line 2302, which goes to the rest of the system. Spring 2303 acts as a buffer between fender 2301 and the rest of the system. While a spring is shown and described, one knowledgeable in the art will realize that other elastic members (such as, but not limited to, bungee cords or bungee cables) could be used for the purpose of swell mitigation. In a second preferred embodiment of the invention, fender 2304 is equipped with a detached top 2307 which can move freely from the rest of fender 2304. Detached top 2307 is attached to the rest of fender 2304 by a spring 2306 internal to fender 2304; spring 2306 has a point of attachment to fender 2304 at its lower end, in the interior of fender 2304. In times of heavy force upon fender 2304 by a swell, spring 2304 serves to buffer the forces by allowing the top of the fender to partially separate temporarily until the stress is relieved. Detached fender top 2307 is then attached to a line 2305 that goes to the rest of the system. Alternatively, an internal spring 2306 may be used without detached top 2307, in which case spring 2306 may be connected directly to line 2305. It should be clear that the examples depicted in these figures are relatively simple configurations practical to clearly show the functional aspects of the system; other structures and parts such as but not limited to protective encasements, retainers, correct mounting hardware, drains, and guides are not depicted. Relative lengths or sizes of the parts are not meant to be to scale for operation.

In some embodiments, the rate of raising fender 1711 may be slowed when fender 1711 approaches an intermediate position; that is, intermediate between a deployed position and a stowed position. In a preferred embodiment, as fender 1711 just begins to enter the protective enclosure (e.g., protective enclosure 1701), the rate of raising fender 1711 is reduced, to reduce the likelihood of fouling and to potentially reduce the impact resulting from any misalignment, fouling, or other problem. It will be recognized by one having ordinary skill in the art that various means of detecting when to change (e.g., reduce) the rate of raising of fender 1711 may be used according to the invention. For example, a time duration of raising may be used or, if a stepper motor is used, a count of the number of steps during the raising of fender 1711 may be used. Additionally, various switches, such as electromagnetic proximity switches of mechanical switches, may be placed so that they send a signal to the control system as fender 1711 passes, for example, the lower end of protective enclosure 1701 while being raised. In some embodiments, protective enclosure 1701 may be partially open, with a lower circumferential ring at its lowest opening, a partially closed cylindrical portion above this lower circumferential ring, and a fully closed upper portion. In such embodiments, lowering of the rate of raising of fender 1711 into protective enclosure 1701 would typically occur as the top of fender 1711 enters the lower ring of protective enclosure 1701. Other variations are clearly possible, according to the invention, as will be appreciated by one having ordinary skill in the art.

The skilled person will be aware of a range of possible modifications of the various embodiments described above. Accordingly, the present invention is defined by the claims and their equivalents.

What is claimed is:

1. A system with a protective enclosure for stowing a boat fender, the protective enclosure attached to a vessel, the protective enclosure having an opening for threading through a line, the line being attached to the boat fender by a spring or elastic cord, the line operable to pull the fender into the protective enclosure through the opening in the protective enclosure;
    wherein the protective enclosure comprises a moveable bar positioned across a lower opening of the protective enclosure above the boat fender, the moveable bar having an opening for guiding the line, the line passing through the opening;
    wherein the moveable bar is moveable along a substantially vertical cylindrical axis of the protective enclosure and acts to guide the boat fender as it is pulled into the protective enclosure.

2. The system of claim 1, wherein the line threaded through the protective enclosure of at least one of the protective enclosures is attached directly to the boat fender.

3. The system of claim 2, wherein the line of at least one of the protective enclosures is routed inside the protective enclosure and exits from any point along a length of the protective enclosure including the opening through which the fender is stowed and deployed, obviating the need for a second opening.

4. The system of claim 3, wherein the moveable bar of at least one of the protective enclosures is replaced by a plate and the moveable bar of at least one other protective enclosure is replaced by a cage.

5. The system of claim 3, wherein the protective enclosure has at least one moveable hinged section, the section formed in such a manner, that when the fender is retracted into the top of the protective enclosure, the movable section clamps in on the fender and secures it within the protective enclosure.

6. The system of claim 3, wherein a plurality of components are made of plastic suitable for molding.

7. The system of claim 3, wherein the protective enclosure and the moveable bar is made of a rigid material.

8. The system of claim 3, wherein a plurality of components comprise are made of a combination of rigid metal parts and plastic materials.

9. The system of claim 3, wherein a cleat is provided to secure a line in a plurality of positions, one of which has the fender fully retracted and at least one other of which has the fender deployed; and
    wherein the cleat is mounted in an easy to reach location on the vessel.

10. The system of claim 9, wherein the cleat may be released with a controlled jerking of the line, either by mechanized means or manually.

11. The system of claim 9, wherein the protective enclosure may be mounted with at least one hinge to a stationary part of the boat within the boat's outline, the hinge operable to allow the protective enclosure to swing out from the boat's outline, for easy deployment of the fender.

12. The system of claim 11, further comprising a lever attached to a second stationary part of the boat, the lever being used to initiate and stop or reverse the swinging out of the protective enclosure.

13. The system of claim 12, wherein the lever may be a hinged arm.

14. The system of claim 12, wherein the lever may be operated manually.

15. The system of claim 12, wherein the lever may be operated by a mechanized system.

16. The system of claim 11, wherein an external force makes the protective enclosure swing back into the hull line.

17. The system of claim 3, wherein the protective enclosure may be mounted with a hinge, enabling the protective enclosure to extend out through an opening in the railing, to facilitate an easier deployment of the fender.

18. The system of claim 17, wherein the fender is deployed with the help of a motor.

19. The system of claim 18, wherein swing-out is achieved with the help of an additional motor.

* * * * *